(12) United States Patent
Verplanken et al.

(10) Patent No.: US 12,346,253 B2
(45) Date of Patent: Jul. 1, 2025

(54) CACHE LOOKUP RESPONSE FILTERING

(71) Applicant: Arm Limited, Cambridge (GB)

(72) Inventors: Fabrice Jean Verplanken, Sheffield (GB); Rakesh Raman, Sheffield (GB); Nikita PrakashChandra Bhandari, Austin, TX (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 18/476,659

(22) Filed: Sep. 28, 2023

(65) Prior Publication Data
US 2025/0110874 A1    Apr. 3, 2025

(51) Int. Cl.
*G06F 12/0808*   (2016.01)
*G06F 12/02*     (2006.01)
*G06F 13/18*     (2006.01)

(52) U.S. Cl.
CPC ...... *G06F 12/0808* (2013.01); *G06F 12/0292* (2013.01); *G06F 13/18* (2013.01); *G06F 2212/1021* (2013.01)

(58) Field of Classification Search
None
See application file for complete search history.

(56) References Cited

U.S. PATENT DOCUMENTS

| | | | | |
|---|---|---|---|---|
| 5,761,445 A | * | 6/1998 | Nguyen | G06F 13/362 710/100 |
| 5,813,028 A | * | 9/1998 | Agarwala | G06F 12/0891 711/143 |
| 2014/0108737 A1 | * | 4/2014 | Bhoria | G06F 12/0891 711/136 |
| 2019/0235785 A1 | * | 8/2019 | Akers | G06F 3/0659 |
| 2020/0192818 A1 | * | 6/2020 | Gandhi | G06F 12/1036 |

* cited by examiner

*Primary Examiner* — Charles J Choi
(74) *Attorney, Agent, or Firm* — NIXON & VANDERHYE P.C.

(57) ABSTRACT

Cache invalidation circuitry responds to a cache invalidation command specifying invalidation scope information indicative of at least one invalidation condition, to control a cache to perform an invalidation process to invalidate cache entries satisfying the invalidation condition(s). Cache lookup circuitry issues to the cache a cache lookup request specifying address information, to request that the cache returns a cache lookup response. Cache lookup response filtering circuitry is responsive to a given hit-indicating cache lookup response which provides cached information and invalidation qualifying information returned from a corresponding valid cache entry, to determine whether the given hit-indicating cache lookup response conflicts with an in-progress cache invalidation command, based on the invalidation scope information specified by the in-progress cache invalidation command and the invalidation qualifying information, and when conflict is detected, causes the given hit-indicating cache lookup response to be treated as a miss-indicating cache lookup response.

20 Claims, 9 Drawing Sheets

CACHE LOOKUP RESPONSE FILTERING

BACKGROUND

Technical Field

The present technique relates to the field of caches.

Technical Background

A data processing system may have at least one cache which can be looked up based on address information to provide cached information associated with the address information. There can be a risk that cached information becomes stale when a corresponding copy of information associated with the address information is updated in memory. Therefore, a cache invalidation command may be used to request that cache entries satisfying at least one invalidation condition are invalidated.

SUMMARY

At least some examples of the present technique provide an apparatus comprising:
 cache invalidation circuitry responsive to a cache invalidation command specifying invalidation scope information indicative of at least one invalidation condition, to control a cache to perform an invalidation process to invalidate cache entries satisfying the at least one invalidation condition, a given cache entry specifying cached information and invalidation qualifying information for use in determining whether the given cache entry satisfies the at least one invalidation condition;
 cache lookup circuitry to issue to the cache a cache lookup request specifying address information, to request that the cache returns a cache lookup response; and
 cache lookup response filtering circuitry responsive to a given hit-indicating cache lookup response which provides the cached information and the invalidation qualifying information returned from a corresponding valid cache entry corresponding to the address information specified by a given cache lookup request, to:
  determine whether the given hit-indicating cache lookup response conflicts with an in-progress cache invalidation command, based on the invalidation scope information specified by the in-progress cache invalidation command and the invalidation qualifying information returned from the corresponding valid cache entry by the given hit-indicating cache lookup response; and
  in response to determining that the given hit-indicating cache lookup response conflicts with the in-progress cache invalidation command, cause the given hit-indicating cache lookup response to be treated as a miss-indicating cache lookup response indicating that the cache does not comprise any valid cache entry corresponding to the address information of the given cache lookup request.

At least some examples provide a system comprising:
 the apparatus described above, implemented in at least one packaged chip;
 at least one system component; and
 a board,
 wherein the at least one packaged chip and the at least one system component are assembled on the board.

At least some examples provide a chip-containing product comprising the system described above assembled on a further board with at least one other product component.

At least some examples provide a non-transitory computer-readable medium to store computer-readable code for fabrication of an apparatus comprising:
 cache invalidation circuitry responsive to a cache invalidation command specifying invalidation scope information indicative of at least one invalidation condition, to control a cache to perform an invalidation process to invalidate cache entries satisfying the at least one invalidation condition, a given cache entry specifying cached information and invalidation qualifying information for use in determining whether the given cache entry satisfies the at least one invalidation condition;
 cache lookup circuitry to issue to the cache a cache lookup request specifying address information, to request that the cache returns a cache lookup response; and
 cache lookup response filtering circuitry responsive to a given hit-indicating cache lookup response which provides the cached information and the invalidation qualifying information returned from a corresponding valid cache entry corresponding to the address information specified by a given cache lookup request, to:
  determine whether the given hit-indicating cache lookup response conflicts with an in-progress cache invalidation command, based on the invalidation scope information specified by the in-progress cache invalidation command and the invalidation qualifying information returned from the corresponding valid cache entry by the given hit-indicating cache lookup response; and
  in response to determining that the given hit-indicating cache lookup response conflicts with the in-progress cache invalidation command, cause the given hit-indicating cache lookup response to be treated as a miss-indicating cache lookup response indicating that the cache does not comprise any valid cache entry corresponding to the address information of the given cache lookup request.

At least some examples provide a method comprising:
 in response to a cache invalidation command specifying invalidation scope information indicative of at least one invalidation condition, controlling a cache to perform an invalidation process to invalidate cache entries satisfying the at least one invalidation condition, a given cache entry specifying cached information and invalidation qualifying information for use in determining whether the given cache entry satisfies the at least one invalidation condition;
 issuing to the cache a cache lookup request specifying address information, to request that the cache returns a cache lookup response; and
 in response to a given hit-indicating cache lookup response which provides the cached information and the invalidation qualifying information returned from a corresponding valid cache entry corresponding to the address information specified by a given cache lookup request:
  determining whether the given hit-indicating cache lookup response conflicts with an in-progress cache invalidation command, based on the invalidation scope information specified by the in-progress cache invalidation command and the invalidation qualifying information returned from the corresponding valid cache entry by the given hit-indicating cache lookup response; and in response to determining that the given hit-indicating cache lookup response conflicts with the in-progress cache invalidation command, causing the given hit-indicating cache lookup response to be treated as a miss-indicating cache lookup response indicating that the cache does not comprise any valid cache entry corresponding to the address information of the given cache lookup request.

Further aspects, features and advantages of the present technique will be apparent from the following description of examples, which is to be read in conjunction with the accompanying drawings.

DESCRIPTION OF EXAMPLES

Figure 1:
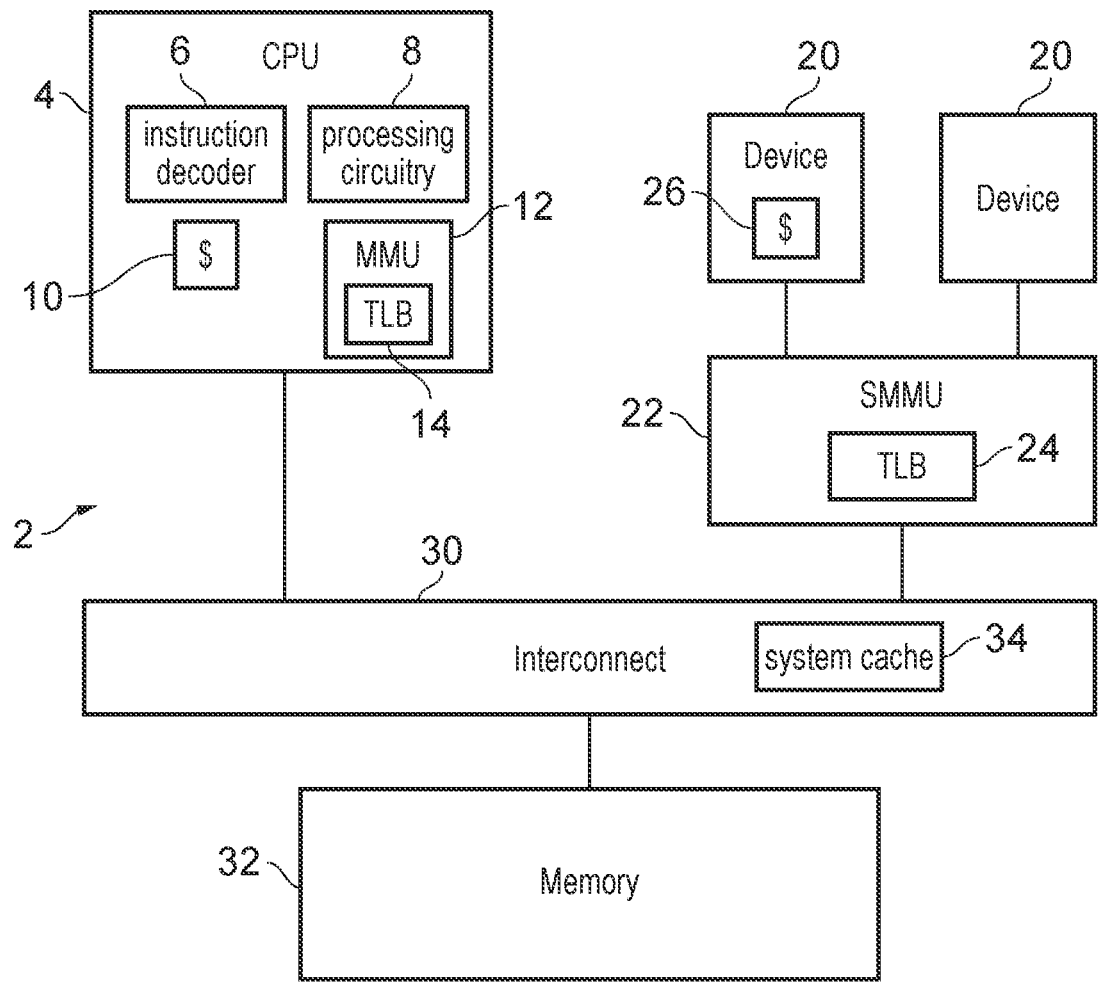
FIG. 1 illustrates an example of an apparatus comprising one or more caches.

An apparatus has cache invalidation circuitry which is responsive to a cache invalidation command specifying invalidation scope information indicative of at least one invalidation condition, to control a cache to perform an invalidation process to invalidate cache entries satisfying the at least one invalidation condition. A given cache entry of the cache specifies cached information and invalidation qualifying information for use in determining whether the given cache entry satisfies the at least one invalidation condition. The apparatus also has cache lookup circuitry to issue to the cache a cache lookup request specifying address information, to request that the cache returns a cache lookup response. For example, the address information could include a full target address for which cached information is sought, a portion of the target address, or a set index derived from the target address and a tag value derived from the target address for lookup of a set-associative cache in which the tag value is compared with tag values stored in a set of cache entries identified based on the set index. In some examples, a cache lookup request could also specify other information for looking up the cache, such as a context identifier.

Based on the cache lookup request, the cache can look up whether the cache includes a valid cache entry corresponding to the address information specified by the cache lookup request, and return as the cache lookup response either a hit-indicating cache lookup response which provides the cached information associated with the address information or a miss-indicating cache lookup response which indicates that the cache does not comprise any valid cache entry corresponding to the address information.

However, there is a risk of potential conflict between a cache invalidation command and one or more cache lookup requests which may have been in-flight at the time when the cache invalidation command is received or which may be received after the cache invalidation command but before all cache entries satisfying the at least one invalidation condition are guaranteed to have been invalidated.

One approach to dealing with such conflicts between invalidations and lookups can be to delay processing of the cache invalidation command until any in-flight cache lookups are complete, then stall cache lookups received after the cache invalidation command until the cache invalidation command is complete, to ensure that any invalidations triggered by the cache invalidation command are respected by the subsequently received cache lookups. However, in some cache designs both the cache invalidation process and the cache lookup process may be relatively lengthy, so this approach would be poor for system performance, as any downstream circuitry which is waiting for the invalidation or the lookup to be processed will also be delayed.

In the examples below, cache lookup response filtering circuitry is provided, which filters cache lookup responses based on detecting conflict with an in-progress cache invalidation command. A given hit-indicating cache lookup response provides the cached information and the invalidation qualifying information returned from a corresponding valid cache entry corresponding to the address information specified by a given cache lookup request. In response to the given hit-indicating cache lookup response, the cache lookup response filtering circuitry determines whether the given hit-indicating cache lookup response conflicts with an in-progress cache invalidation command, based on the invalidation scope information specified by the in-progress cache invalidation command and the invalidation qualifying information returned from the corresponding valid cache entry by the given hit-indicating cache lookup response. In response to determining that the given hit-indicating cache lookup response conflicts with the in-progress cache invalidation command, the cache lookup response filtering circuitry causes the given hit-indicating cache lookup response to be treated as a miss-indicating cache lookup response indicating that the cache does not comprise any valid cache entry corresponding to the address information of the given cache lookup request.

By providing circuitry for filtering out hit-indicating cache lookup responses which conflict with an in-progress cache invalidation request so that they are treated as a miss-indicating cache lookup response, this avoids a need to stall either cache invalidation commands or cache lookups in the period around a cache invalidation, which is beneficial for performance. Also, by providing the filtering on the cache lookup response path, rather than performing the filter comparison on a path for processing the cache lookup requests before they are sent to the cache, this allows invalidation qualifying information returned from a corresponding valid cache entry by a hit-indicating cache lookup response to be considered when deciding whether a given hit-indicating cache lookup response conflicts with the in-progress cache invalidation request. This allows more precise determination of whether there would actually be a conflict (in comparison to a more conservative approach checking for conflict based on address information associated with cache lookup requests, which would not be able to consider the invalidation qualifying information of any particular valid cache entry, and so would conservatively assume the worst case scenario that the invalidation qualifying information of a hit valid cache entry did satisfy the invalidation condition(s) specified by the scope information of the in-progress cache invalidation command). By considering at least some invalidation qualifying information returned with the hit-indicating cache lookup response, more precise conflict detection is possible and so it is less likely that a given hit-indicating cache lookup response is demoted to a miss-indicating cache lookup response due to conflict with a given in-progress cache invalidation command when actually the corresponding valid cache entry would not have been invalidated by the invalidation command.

The invalidation qualifying information may not be the only information used to evaluate whether the at least one invalidation condition is satisfied by a given cache entry. For example, evaluation of the at least one invalidation condition may also depend on address tag information associated with the given cache entry, a set index associated with the given cache entry and/or on context information indicative of a software context associated with the given cache entry.

It is not essential that all invalidation qualifying information stored in a given cache entry (that could in principle be used for checking whether the given cache entry meets the at least one invalidation condition) is returned with the hit-indicating cache lookup response for use in detecting conflicts with cache invalidation commands. In some examples, the invalidation qualifying information returned with the cache lookup response may be only a portion of the invalidation qualifying information specified by the corresponding valid cache entry, so that there may still be a possibility that the conflict detected by the cache lookup response filtering circuitry is a false positive, as other invalidation qualifying information not returned with the cache lookup response could affect whether or not the corresponding valid cache entry is deemed to satisfy the invalidation condition(s) of a given in-progress cache invalidation command. Nevertheless, including at least some invalidation qualifying information (even if not all) with the cache lookup response enables more precise determination of conflicts than if no invalidation qualifying information was considered at all and the conflict detection implemented on the lookup request path rather than the lookup response path.

The invalidation qualifying information could be implemented in different ways.

In some examples, the invalidation qualifying information for the given cache entry comprises size information indicative of a size of an address range to which the cached information is applicable. By considering the size information when identifying conflict between an in-progress cache invalidation command and a hit-indicating cache lookup response, more precise conflict detection is possible than would be possible if filtering was implemented at the cache request stage when the size information defined in a specific cache entry would not be available.

Another example of invalidation qualifying information can be invalidation range information indicative of an invalidation range of addresses associated with the given cache entry, where for at least one type of cache invalidation command the invalidation scope information specifies a set of one or more invalidation target addresses and the at least one invalidation condition comprises an address-based invalidation condition which is satisfied by the given cache entry when the set of one or more invalidation target addresses intersects with the invalidation range of addresses associated with the given cache entry. The invalidation range of addresses associated with a given cache entry can be the same as, or different to, the size of the address range to which the cached information of the given cache entry is applicable. One example when invalidation range may be different to the range to which the cached information is applicable can be where the cache is a combined stage-1 and stage-2 translation buffer caching virtual-to-physical address mappings derived from separate stage-1 translation tables (providing stage-1 mappings mapping virtual addresses to intermediate addresses) and stage-2 translation tables (providing stage-2 mappings mapping intermediate addresses to physical addresses). In this case, when there is a mismatch between the stage-1 and stage-2 page sizes used to define the corresponding stage-1 and stage-2 address mappings, the range to which the cached information is applicable would correspond to the smaller of the page sizes used for the corresponding stage-1 and stage-2 entries respectively, while the invalidation range of addresses would correspond to the larger of the page sizes used for the corresponding stage-1 and stage-2 entries.

The cache lookup response filtering technique discussed above could be used in an example where each cache lookup request is triggered by a separate cache lookup command received from a requester.

However, the cache lookup response filtering is particularly useful in an example where the cache lookup circuitry is responsive to a cache lookup command received at a cache lookup command interface, to trigger issuing of two or more cache lookup requests to the cache based on the same cache lookup command. Where a single cache lookup command can trigger multiple cache lookup requests, the cache lookup process performed for a given cache lookup command can be relatively long, and so stalling a cache invalidation to allow in flight cache lookups to complete would cause a significant delay. This delay can be avoided by using the cache lookup response filtering approach discussed above, since it means that cache lookups can continue in parallel with an in-progress cache invalidation, as the cache lookup response filtering circuitry can detect conflicts.

One reason why it may be useful to trigger multiple cache lookup requests from the same cache lookup command is that the same cache storage may be accessible using multiple different set indexing schemes (the set indexing scheme defining the way in which a set of cache entries of a set-associative cache structure is selected for lookup based on an address specified in the cache lookup command). For example, each set indexing scheme may be associated with a different function for deriving a set index value from the address specified in the cache lookup command (e.g. selecting different subsets of bits of the address for deriving the set index value, or using different index hashing functions). For example, accessing a cache with more than one set indexing scheme can be useful for translation lookaside buffers which cache address translation information derived from multi-level page tables, as the address translation information associated the given address could be derived from different levels of the page table structure which are indexed using different subsets of bits of an address.

Hence, in some examples each of the plurality of cache lookup requests specifies a respective set index derived from input address information specified by the cache lookup command, the set index specifying which set of cache entries of the cache is to be looked up for that cache lookup request to determine whether any of that set of cache entries is the corresponding valid cache entry. For each of the plurality of cache lookup requests based on the same cache lookup command, the cache lookup circuitry is configured to generate the set index based on a different set indexing function for deriving the set index from the input address information.

The cache lookup circuitry may issue the plurality of cache lookup requests as a hierarchical sequence of cache lookup requests, where the cache lookup circuitry is configured to trigger issuing of a next cache lookup request of the hierarchical sequence to the cache in response to detecting the miss-indicating cache lookup response being returned by the cache as a response to a previous lookup request in the hierarchical sequence. Hence, there may be a certain hierarchical order of preference so that if a hit is detected in a particular cache lookup request of the hierarchical sequence, there is no need to continue with remaining requests of the hierarchical sequence. With such an "incremental" approach where a given request (other than the very first request) in the sequence is sent when a miss is detected for the preceding request in the sequence, the overall period of time taken to handle a given cache lookup command can be lengthy, which increases the performance impact if a cache invalidation command was delayed while waiting for in-flight cache lookups to complete. Hence, the cache response filtering approach described above can be particularly useful for lookup schemes involving such a hierarchical sequence of lookups for the same cache command, as it avoids the need to stall an invalidation for a considerable period while the hierarchical sequence for an in-flight cache lookup completes.

In response to the given hit-indicating cache lookup response being treated as the miss-indicating cache lookup response due to conflict with the in-progress cache invalidation command when the given hit-indicating cache lookup response is received in response to one of the plurality of cache lookup requests other than a final cache lookup request in the hierarchical sequence, the cache lookup circuitry may issue the next cache lookup request of the hierarchical sequence to the cache.

Hence, it is possible that, for the plurality of cache lookup requests in the hierarchical sequence generated in response to the same cache lookup command, the cache lookup response filtering circuitry is capable of determining that a first hit-indicating cache lookup response received in response to one cache lookup request of the hierarchical sequence conflicts with the in-progress cache invalidation command but a second hit-indicating cache lookup response received in response to another cache lookup request of the hierarchical sequence does not conflict with the in-progress cache invalidation command. This means the conflict can be identified more precisely than in alternative approaches which do not consider the invalidation qualifying information of a given cache entry in which a cache hit was detected for a cache lookup when deciding whether there is conflict between an in-progress cache invalidation and in-flight cache lookup operations, as the consideration of invalidation qualifying information from the specific cache entry detected in the hit for a particular cache lookup request/response means that it is not necessary to make more conservative conflict decisions based on the address specified by the cache lookup command as a whole. Even if one cache lookup request returns a response which is determined to conflict with an in-progress cache invalidation command, another cache lookup request for the same cache lookup command may return a hit-indicating cache lookup response which does not conflict and so does not need to be demoted to a miss. By reducing the likelihood of a hit being demoted to a miss, this improves performance because it is less frequent that required information has to be obtained from a slower-to-access location than the cache itself (e.g. the data being obtained from a further level of cache or main memory on a cache miss).

Cache response interface circuitry may be provided to transmit a cache miss response message to a recipient, in response to the cache lookup response filtering circuitry determining that a final cache lookup response received from the cache in response to a final cache lookup request of the hierarchical sequence is either the miss-indicating cache lookup response or is the hit-indicating cache lookup response treated as the miss-indicating cache lookup response due to conflict with the in-progress cache invalidation command. The recipient of the cache miss response could be either the requester which sent the cache invalidation command, or could be a forwarding recipient other than the requester (e.g. the forwarding recipient can be cache control logic associated with a further level of cache, or a memory controller or interconnect used to access main memory, which is to be looked up for the required information in the event of a miss).

On the other hand, the cache response interface circuitry may transmit a cache hit response message to a recipient, in response to the cache lookup response filtering circuitry determining that the hit-indicating cache lookup response was received from the cache in response to a cache lookup request, where the hit-indicating cache lookup response is not determined to conflict with any in-progress cache invalidation command. Again, the recipient of the cache hit response message could be the requester which sent the cache lookup command that triggered the cache lookup request to be issued by the cache lookup circuitry, or could be another recipient other than the requester.

In some examples, the cache response interface circuitry may implement a back-pressure mechanism to defer transmission of a message to the recipient when the recipient is not available to receive the message. This can be helpful to reduce buffering requirements at the recipient, which can reduce the hardware cost of implementing the circuitry at the recipient. For example, a credit-based mechanism can be used between the recipient and the cache response interface circuitry, to allow the recipient to indicate whether it is available to receive a message. If there is insufficient credit available for the interface to transmit another message, the cache response interface circuitry may stall transmission of the cache hit response message, until suitable credit becomes available.

Hence, the back-pressure mechanism means that, once a given hit-indicating cache lookup response has passed the conflict check performed by the cache lookup response filtering circuitry, the corresponding cache hit response message may not be sent to the recipient immediately, as the recipient might be unavailable. Therefore, there is a risk that, in the period when the cache hit response message is waiting to be sent, a new in-progress cache invalidation command may be detected which could potentially conflict with the given hit-indicating cache lookup response. Although the new in-progress cache invalidation command could potentially be stalled until the cache hit response message is sent, to avoid needing to repeat a conflict check for the given hit-indicating cache lookup response, this approach may introduce additional timing dependencies between the cache lookup flow and the cache invalidation flow which may be complex to implement and so be undesirable, and also this may often delay the timing at which the cache invalidation can be observed by external observers, which may tend to reduce performance.

Instead, it can be useful for the cache lookup response filtering circuitry to repeat the conflict detection for the given hit-indicating cache lookup response, this time comparing against the invalidation scope information of the new in-progress cache invalidation command, and support a withdrawal of the cache hit response message if, despite previously passing the conflict check, the given hit-indicating cache lookup response is now deemed to conflict with the newly received in-progress cache invalidation command.

Hence, in response to the cache lookup response filtering circuitry detecting a new in-progress cache invalidation command which conflicts with a transmission-pending hit-indicating cache lookup response which was previously determined not to be conflicting with any in-progress cache invalidation command but for which a corresponding cache hit response message is yet to be transmitted to the recipient by the cache response interface circuitry, the cache lookup response filtering circuitry may withdraw the cache hit response message from being transmitted to the recipient.

In some examples, the cache invalidation circuitry may send an invalidation acknowledgement to a recipient in response to the cache invalidation command, the invalidation acknowledgement specifying to the recipient that the recipient can proceed assuming that all cache entries of the cache satisfying the at least one invalidation condition have been invalidated. The timing at which the invalidation acknowledgement is sent in response the cache invalidation command can have a relatively significant effect on system performance. One alternative approach which would be relatively simple to implement (to avoid complexity in handling conflict with in-flight cache lookups) can be to delay sending the invalidation acknowledgement for a given cache invalidation command until the required invalidations in the cache have actually been performed. However, the invalidation process can be lengthy (e.g. involving a "walk" through each entry of the cache to check whether each entry meets the invalidation condition(s)), so this would delay recipients which require the invalidation to be guaranteed to have taken effect before they perform processing potentially affected by the invalidation, which can reduce system performance. For example, various recipients may be waiting for the invalidation to be acknowledged to guarantee that subsequent operations observe the effects of the invalidation and so are not being performed on stale cached information. Hence, for performance it can be useful to implement the cache invalidation circuitry so that it sends the invalidation acknowledgement to the recipient before it is guaranteed that all cache entries of the cache satisfying the at least one invalidation condition have been invalidated.

However, once the invalidation acknowledgement has been sent to the recipient, this means that any subsequently returned cache lookup responses are required to give a result which is consistent with the result which would have been achieved had those cache lookups taken place after the invalidation process was already complete (otherwise the recipient's assumption that required invalidations have been performed could risk giving incorrect results). The cache lookup response filtering approach discussed above is particularly useful for supporting the option of acknowledging an invalidation command before it is actually been fully processed, since the filtering of cache lookup responses based on conflict detection eliminates the need to stall cache lookups in the time when the invalidation is being processed (or stall acknowledgement of the invalidation while outstanding cache lookups are completed). By enabling lookups to continue in the shadow of an in-progress invalidation and allow for the invalidation to be acknowledged before actually fully implemented, the filtering enables improved system performance by reducing delays seen by other observers awaiting the cache lookup results and the effects of the invalidation.

Hence, in some examples, the in-progress cache invalidation request comprises a cache invalidation request for which the invalidation acknowledgement has already been sent to the recipient but for which it is not yet guaranteed that all cache entries of the cache satisfying the at least one invalidation condition have been invalidated.

The technique discussed in this application can be used for any type of cache. However, it is particularly useful where the cache comprises a translation lookaside buffer (TLB), for which the cached information comprises address translation information derived from one or more translation tables (e.g. page tables). The address translation information could include address translation mappings, address region attributes derived from translation tables, and/or pointers to subsequent levels of translation table, so the TLB is not restricted to caching the leaf entries of the final level of translation table accessed in a translation table walk, but the TLB could also be a page walk cache which caches table pointer information from higher levels of translation table accessed in the page table walk.

The techniques discussed here are particularly useful for TLBs because, unlike data caches caching general purpose data form main memory, with TLBs the cached information is derived from translation tables, which may often support features such as variable-size pages and multi-level translation table structures, which can make both invalidations and cache lookups more complex. For example, use of variable-size pages may make it more likely that invalidation qualifying information stored in the cache entry itself is relevant to deciding whether an entry meets the invalidation conditions for a given invalidation. Caching information from multi-level translation table structures may make it more likely that multiple cache set indexing schemes are in use which will tend to prolong the length of time taken to handle cache lookup commands, increasing likelihood of conflict with cache invalidation commands.

Nevertheless, a TLB is just one example of a cache, and other examples of caches may also benefit from this approach to detecting conflict between cache lookups and invalidations.

FIG. 1 schematically illustrates an example of an apparatus (e.g. a data processing system, integrated circuit or system on chip) 2 having at least one processor 4. In this example the processor is a CPU (Central Processing Unit), but other examples of processors include a GPU (Graphics Processing Unit) or NPU (Neural Processing Unit—a type of processor with specialized hardware for accelerating vector and/or matrix operations or other operations used in Neural Network and other machine learning processing). The processor 4 has an instruction decoder 6 for decoding program instructions and processing circuitry 8 which is controlled to perform processing operations in response to the instructions decoded by the instruction decoder 6. The processor 4 has at least one cache 10 for caching data from memory for faster access by the processor, and has a memory management unit (MMU) 12 which functions as address translation circuitry for translating virtual addresses specified by instructions executed by the processor 4 into physical addresses identifying locations within the memory system. The MMU may have at least one TLB (translation lookaside buffer) 14 for storing translation entries which depend on page table data from page table structures stored in the memory system. The page table structures (translation table structures) define the address mappings between virtual and physical addresses and may also define memory access permissions which may define whether certain software processes executing on the processor 4 are allowed to access certain addresses. The MMU 12 may support 2-stage address translation where the mapping of a virtual address to a physical address depends on both stage 1 address translation data which maps the virtual address (VA) to an intermediate physical address (IPA) and stage 2 translation data which maps the IPA to a physical address (PA). The stage 1 address translation data may be set by an operating system or virtual machine. The stage 2 translation data may be set by a hypervisor.

The processor 4 is an example of a requester device which is capable of executing program instructions. While FIG. 1 only shows one such requester device, it will be appreciated that system 2 could have two or more such devices, which may include further CPUs or could include other types of instruction execution devices such as a graphics processing unit (GPU).

In addition to the processor 4 capable of instruction execution which have its own internal MMU 12, the system may also include requester devices 20 which may not have an internal MMU, and so for accessing memory and providing address translation functionality, such devices may communicate with the rest of the system via a system memory management unit (SMMU) 22 which includes address translation circuitry which controls address translation and memory permissions based on translation data defined in page table structures in memory. Again, the SMMU 22 may have one or more TLBs 24 which have a similar functionality to the TLBs 14 within the MMU 12 of the processor 4. The devices 20 which access memory via the SMMU 22 can include cached devices which include an internal cache 26 and uncached devices which do not have any cache. For example, a device 20 could include a display controller for controlling display of image frames on display, a network controller for controlling input or output of data via a network, a hardware accelerator for performing certain dedicated processing functions in a more efficient manner than can be achieved using software executing on a generic processor such as the processor 4, and so on.

All of the requester devices 4, 20 communicate with each other via an interconnect 30 which is responsible for routing transactions between the requester devices and memory 32. Interconnect 30 may also be responsible for managing coherency between data cached in respective caches 10, 26 of the system. The interconnect 30 may have a system cache 34 shared between the requesters 4, 20, which caches a subset of data from memory 32 for faster access than if the data has to be accessed in main memory, but which is slower to access for a given requester than that given requester's private cache 10, 26. It will be appreciated that FIG. 1 is a simplified diagram and the apparatus 2 may have many other components not shown in FIG. 1 for conciseness.

Hence, the apparatus 2 may comprise a number of caches 10, 14, 26, 24, 34 for holding cached information corresponding to addresses. Each cache can be looked up based on an input address to identify whether the cache holds cached information corresponding to that address. If the cache includes a valid entry corresponding to that address, a hit is detected and the cached information from the corresponding entry is returned. If the cache does not include a valid entry corresponding to the input address, a miss is detected, and the required information may be requested from a further cache or main memory 32. Various types of cache may be provided, including data caches 10, 26 for caching data from the memory 32, instruction caches for caching executive will instructions from the memory 32, and/or TLBs 14, 24 for caching address translation information derived from translation table structures (page tables) stored in the memory 32. The address translation information cached in the TLBs 14, 24 can include address translations mappings, which could be stage 1 mappings from VA to IPA, stage 2 mappings from IPA to PA, or combined stage-1-and-2 mappings from VA direct to PA (the VA-to-PA mapping being derived from separate VA-IPA and IPA-PA mappings specified in respective stage 1 and stage 2 page table entries). The cached address translation information can also include other information obtained from page tables, such as address region attributes, and/or page table pointers from higher-level page tables of a multi-level page table structure, which indicate an address in memory where a subsequent level of page table is stored.

Figure 2:
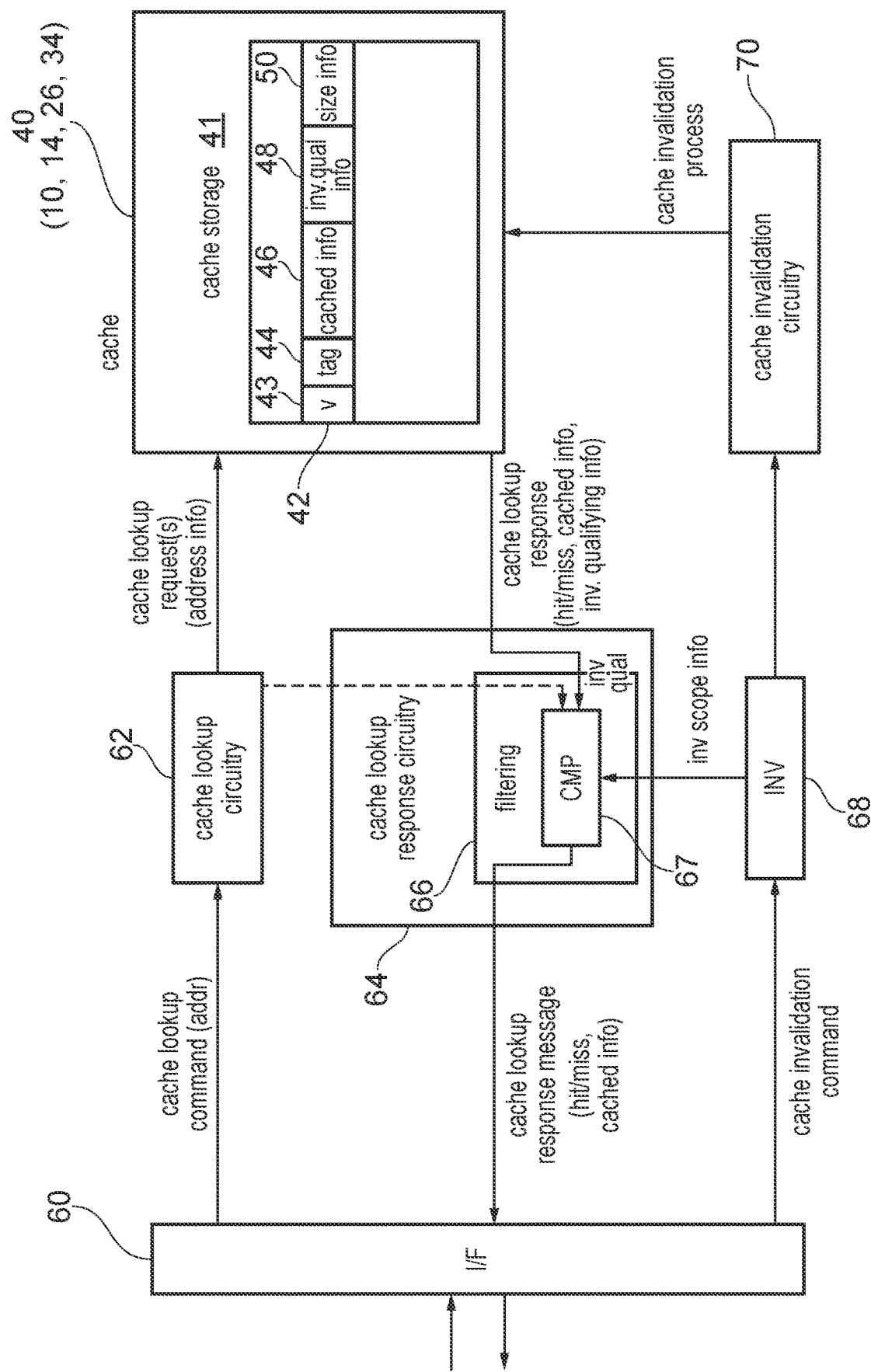
FIG. 2 illustrates an example of filtering cache lookup responses based on detecting conflicts with in-progress cache invalidation commands.

FIG. 2 illustrates in more detail an example of a cache 40 and associated circuitry for looking up the cache and handling cache invalidations. The cache 40 could be any of the caches 10, 14, 26, 34 shown in FIG. 1. The cache 40 includes cache storage circuitry 41 comprising a number of cache entries 42. Each entry 42 holds a number of pieces of information, including for example: a valid indication 43 indicating whether that entry 42 is valid, an address tag 44 used for looking up which address corresponds to cached information 46 stored in that entry 42, the cached information 46 itself, invalidation qualifying information 48 used during a cache invalidation operation to determine whether the entry 42 should be invalidated, and size information 50 indicative of a size of an address range for which the cached information 46 is applicable (the size information 50 can be used in a cache lookup operation to determine whether input address information corresponds to an address region of size identified by the size information 50 at an address derived from the combination of set index and tag value 44 for that cache entry 42). In some examples, it may not be needed to express the size information 50 separately from the invalidation qualifying information 48, if the size of the range of addresses to which the cached information 46 is applicable is always the same as the invalidation range of addresses for which an invalidation affecting any address within that range should trigger invalidation of the cache entry 42. However, for some types of caches, such as TLBs 14, 24 caching combined stage-1-and-2 mappings, it can be useful to specify the size information 50 separately from the invalidation qualifying information 48, as when address translation information specified by the cached information 46 is derived from a stage 1 page table entry corresponding to a first page size and a stage 2 page table entry corresponding to a second page size, the size information 50 may correspond to the smaller of the first and second page sizes while the invalidation qualifying information 48 may corresponds to the larger of the first and second page sizes. In some examples, the invalidation qualifying information 48 and/or size information 50 may be represented as mask information which is used to mask out part of address information and/or tag 44 when comparing address information against the tag 44, so that the mask implicitly identifies the size of the invalidation range and/or range to which the cached information 46 is applicable, as when masking out a greater number of less significant bits of the address and tag, the size will be larger than if fewer less significant bits are masked out.

It will be appreciated that FIG. 2 shows just one example of possible information which can be included in a given cache entry 42, and other types of information can be included. For example, context information may be included to specify a software context associated with the cached information 46. For example, the context information may specify an address space identifier (ASID) indicative of which set of stage 1 address translation tables was used to derive the cached information 46, and/or a virtual machine identifier (VMID) indicative of which set of stage 2 address translation tables was used to derive the cached information 46. Other examples of information included in a cache entry 42 can include coherency state information used to control cache coherency using the interconnect 30, and/or replacement policy information used to select which entry of the cache to replace when a new entry is to be allocated to the cache.

The cache 40 is associated with a command interface 60 for receiving cache commands (including cache lookup commands and cache invalidation commands) from other portions of the apparatus, such as the processor 4, SMMU 22, device 20 or interconnect 30, and transmitting responses to the cache commands, such as cache hit or miss response messages and invalidation acknowledgements. Although the interface 60 is shown as a single interface of FIG. 2, in some examples separate interfaces may be provided for different classes of commands or responses, or for routing commands from different subsets of components to the cache or returning responses to different subsets of components of the system 2.

In response to a cache lookup command received at the interface 60, cache lookup circuitry 62 generates one or more cache lookup requests and sends those requests to the cache 40. Each lookup request specifies address information derived from an input address specified by the cache lookup command. For example, the address information could include the input address itself, a subset of bits from the input address, or a set index derived as a function of the input address (if a set index is specified, the address information may also specify a tag value to be compared with tags from a corresponding set of cache entries 42 during the lookup). Although not shown in FIG. 2, the cache lookup request could also specify other types of lookup information, such as context information (e.g. ASID and/or VMID as mentioned above) identifying a software context for which the lookup is to be performed.

Based on the lookup information specified by given cache lookup request, the cache 40 looks up the cache storage 41 and determines whether the cache includes a valid entry 42 corresponding to the specified lookup information. For example, the cache 40 may be implemented according to a set-associative cache structure, and so a set index specified in the address information may be used to select a corresponding set of two or more cache entries 42, and the address tags 44 (and optionally other information, such as context identifiers) may be compared with the address information and any other lookup information specified in the cache lookup request, to determine whether any of the looked up set of entries corresponds to the lookup information specified by the cache lookup request. The size information 50 can be used to qualify any address comparison by masking out bits of the addresses being compared so that a hit can be detected if the input address corresponds to any address in an address range identified by the combination of set index and address tag 44 that has an address range size corresponding to the size information 50.

If one of the looked up set of entries is valid and corresponds to the specified lookup information, a hit is detected and a hit-indicating cache lookup response is returned by the cache 40 to cache lookup response circuitry 64. The hit-indicating cache lookup response specifies at least hit/miss information identifying the response as a hit-indicating cache lookup response (differentiating from a miss response) and the cached information 46 returned from the corresponding entry 42 for which the hit was detected (i.e. the corresponding entry is the entry for which the tag 44 and any other information compared in the lookup corresponds to the lookup information specified in the cache lookup request). As explained further below, the hit-indicating cache lookup request also returns the invalidation qualifying information 48 from the corresponding entry 42, for use in detecting conflict with cache invalidation commands. On the other hand, if none of the looked up set of cache entries 42 is a valid entry corresponding to the lookup information, then a miss-indicating cache lookup response is returned specifying hit/miss information indicating that the response is a miss response. For a miss-indicating cache lookup response, any fields which would be used for cached information 46 and/or invalidation qualifying information 48 for a hit-indicating cache lookup response will be invalid.

In the absence of any cache invalidation commands being processed, the hit/miss-indicating cache lookup responses can be used to derive corresponding cache lookup response messages to be transmitted over the interface 60 to a recipient. The recipient may vary depending on the type of cache 40 and whether the response indicates a hit or miss. For example, for a private cache 10 within the CPU 4 the recipient could be the processing circuitry 8 if a hit is detected but could be a further level of private cache 10 or the interconnect 30 if a miss is detected. For the TLB 24 in the SMMU 22, the recipient could be translation logic within the SMMU 22 if a hit is detected, but could be a further level of TLB 24 within the SMMU 22 or the interconnect 30 if a miss is detected. The interface 60 may use a back-pressure mechanism to control the timing of transmission of any cache lookup response message to the recipient, based on detection of whether the recipient is available to receive the message. For example, a credit-based interface may be used where the interface 60 has a certain number of credits available for transmission of cache lookup response messages, with a credit being consumed when a message is sent to the recipient and becoming available again when the recipient indicates that it has processed a previous message or has a spare slot for receiving the message. This means that sometimes, if the recipient is not currently available, a cache lookup response message may be stalled at the interface 60, so that there is a delay in transmitting it. This stall may propagate back to the cache lookup response circuitry 64 and/or cache lookup circuitry 62 if space for buffering pending cache lookup response messages awaiting transmission runs out at the interface 60.

The cache 40 can hold cached information 46 associated with corresponding memory addresses, but if the underlying data in memory 32 from which that cached information 46 is derived changes, then it may be needed to invalidate corresponding copies of cached information 46 in the cache 40, to ensure that a subsequent cache lookup does not access stale information. Hence, a requester, such as a processor 4 which has or will soon change information in memory (such as translation table data), may send a cache invalidation command to the cache 40 via the interface 60. The cache invalidation command specifies invalidation scope information identifying one or more invalidation conditions to be satisfied by cache entries 42 that are to be invalidated. An in-progress cache invalidation command may be buffered in an invalidation buffer 68 while it is in progress. Cache invalidation circuitry 70 responds to the cache invalidation commands to trigger a cache invalidation process on the cache 40, to request that any cache entries satisfying the invalidation conditions specified by the invalidation scope information are invalidated. For example, the invalidation scope information may identify at least one invalidation address (e.g. a single address, or an address range), and the one or more invalidation conditions may include an address-based condition which is satisfied for a given cache entry when the invalidation address range of the given cache entry (identified based on that entry's set index, tag 44 and invalidation qualifying information 48) intersects with the one or more invalidation addresses specified by the invalidation scope information. Invalidation scope information could also identify other criteria, such as specifying context information identifying a software context, so that a context-based condition is also applied which is satisfied by a given cache entry when that entry specifies a context identifier corresponding to the software context specified by the invalidation scope information. Invalidation scope information could also specify certain types of cached information 46 for which invalidation is required (e.g. distinguishing between information 46 derived from stage-1 and stage-2 translation tables respectively). Hence, in general the determination of whether a given cache entry 42 is to be invalidated made depends on a comparison of the invalidation scope information and one or more pieces of information stored in the cache entry 42 (or implicitly associated with the cache entry, such as a set index). As the invalidation operation could affect more than one cache entry, the cache invalidation process may involve a cache walk operation to look up each cache entry and check each cache entry for whether it satisfies the invalidation condition(s) specified by the invalidation scope information (it may not be possible to identify based on a set index all the entries to be invalidated, without walking through each entry individually). Therefore, the cache invalidation process can be lengthy and so a cache invalidation command may remain in-progress for a long time.

When a cache invalidation command is issued, one or more recipients may be waiting for the cache 40 to send an invalidation acknowledgement in response to the cache invalidation command. The acknowledgement is an indication that the cache 40 guarantees that the effects of the invalidation will be observed for any subsequent lookups to the cache, so that the recipients of the acknowledgement can proceed with any subsequent processing in the assumption that all the required cache invalidations have already been carried out. However, as the cache invalidation process is lengthy, it can be undesirable to wait for the required invalidation to actually be carried out before sending the invalidation acknowledgement to the recipients. Instead, system performance as a whole can be faster if the invalidation acknowledgement is sent before it is guaranteed that all the required invalidations have already completed. This can allow software or hardware processes that rely on the invalidation being acknowledged to start sooner.

However, this means that once the invalidation command has been acknowledged, the cache 40 needs to ensure that any cache lookup requests made to the cache 40 do not return a hit from a cache entry 42 which would subsequently have been invalidated in a remaining part of the cache invalidation process still to be performed. One approach for dealing with this conflict between cache lookups and cache invalidation has been to provide some circuitry associated with the cache lookup circuitry 62, for detecting based on the address information of a cache lookup request and the invalidation scope information of an in-progress cache invalidation command, whether the cache lookup request conflicts with the cache invalidation command, and if so any hit-indicating cache lookup response returned for that cache lookup request is demoted to a miss to prevent potentially stale cached information 46 being returned in response to the cache lookup command which triggered that cache lookup request. However, while this approach of comparing address information of cache lookup requests against invalidation scope information on the cache lookup request path can be simpler to implement, it may be conservative in that it does not consider the invalidation qualifying information 48 stored within any particular cache entry 42 and so needs to assume the worst case scenario that if the cache lookup request hits against an entry, the invalidation qualifying information 48 was such that the entry would satisfy the invalidation scope information specified by the in-progress invalidation command. However, in practice, on many occasions this invalidation qualifying information 48 may have a value such that the corresponding cache entry 42 would not actually have satisfied the conditions defined by the invalidation scope information (e.g. the invalidation qualifying information may indicate a relatively small address range which does not intersect with any address specified by the invalidation scope information).

In the approach shown in FIG. 2, cache lookup response filtering circuitry 66 is instead provided within the cache lookup response circuitry 64 on the response path by which cache lookup responses are returned from the cache 40 to the response interface 60 for transmission to a recipient. The filtering circuitry 66 includes comparison circuitry 67 for comparing parameters of a hit-indicating cache lookup response with the invalidation scope information of any in-progress invalidation commands stored in the invalidation buffer 68, to determine whether the hit-indicating cache lookup response conflicts with the in-progress cache invalidation command. In some cases, the comparator may also consider information provided by the cache lookup circuitry 62 associated with the corresponding cache lookup request that triggered the hit-indicating cache lookup response to be returned by the cache 40 (e.g. the address information and other lookup information (e.g. context information) associated with the cache lookup request, which may not explicitly be represented in the cache lookup response, may be provided to the comparison circuitry 67 by the cache lookup circuitry 62 for comparison with the invalidation scope information of the in-progress cache invalidation command).

Hence, as the filtering circuitry 66 for detecting conflict with in-progress cache invalidations is provided on the cache lookup response path, it is possible to consider the invalidation qualifying information 48 returned from the corresponding cache entry 42 for which a hit was detected, which allows more precise identification of whether that cache entry would have satisfied the one or more invalidation condition specified by the invalidation scope information, and reduces the number of false positive conflicts detected compared to an approach which identifies such conflicts on the cache lookup request path independent of the invalidation qualifying information 48 of any particular entry. This more precise conflict identification means that is less likely that it is necessary for a hit-indicating cache lookup response to be demoted to a miss, which will tend to improve system performance, as when a hit-indicating cache lookup response message can be returned over the interface 60, the recipient that is awaiting the corresponding cached information can proceed with its operation faster than if a miss returned and the information has to be obtained from a further (slower) level of cache or from main memory 32.

Figure 3:
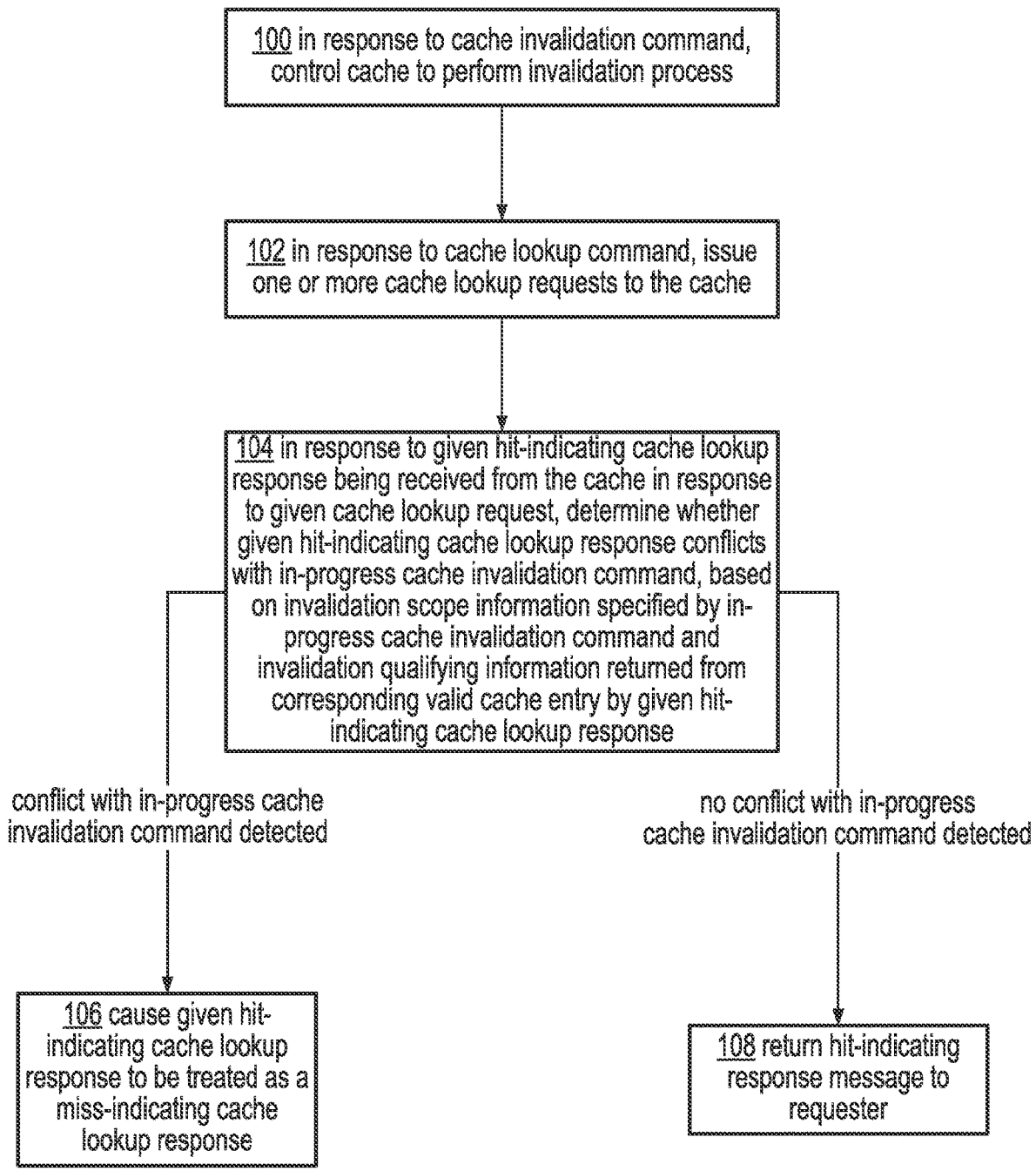
FIG. 3 illustrates a method including cache lookup response filtering.

Hence, FIG. 3 is a flow diagram showing a method of controlling a cache in response to cache invalidation commands and cache lookup commands. At step 100, in response to a cache invalidation command, cache invalidation circuitry 70 controls the cache 40 to perform an invalidation process to invalidate cache entries satisfying at least one invalidation condition specified by invalidation scope information indicated by the cache invalidation command. Such invalidation conditions could include any one or more of an address based condition, a context-based condition, and a cached information type condition as mentioned earlier.

At step 102, in response to a cache lookup command, the cache lookup circuitry 62 issues one or more cache lookup requests to the cache 40, requesting that the cache returns a cache lookup response indicating whether or not the cache comprises a valid entry 42 having cached information 46 corresponding to address information (and optionally other lookup information such as context information) specified by the cache lookup request.

At step 104, in response to a given hit-indicating cache lookup response being received from the cache 40 in response to a given cache lookup request, cache lookup response filtering circuitry 66 determines whether the given hit-indicating cache lookup response conflicts with the in-progress cache invalidation command. The conflict determination is based on invalidation scope information specified by the in-progress cache invalidation command and the invalidation qualifying information 48 returned from the corresponding valid cache entry 42 by the given hit-indicating cache lookup response. The conflict detection can also be based on other information, such as the address information or other lookup information provided by the cache lookup request which caused the given hit-indicating cache lookup response to be returned by the cache 40.

If the given hit-indicating cache lookup response is determined to conflict with the in-progress cache invalidation command, then at step 106 the filtering circuitry 66 causes the given hit-indicating cache lookup response to be treated as a miss-indicating cache lookup response. For example, this may cause a further lookup of the cache 40 to be performed (e.g. with a different type of address information, such as a set index derived in a different manner from a set index used for the previous lookup request), or could cause a cache miss response message to be transmitted to a recipient by the interface 60.

If no conflict with the in-progress cache invalidation command is detected by the filtering circuitry 66, then at step 108 the interface 60 returns a hit-indicating response message to a recipient (e.g. the requester which sent the cache lookup command), the hit-indicating response message indicating the cached information 46 that was returned from the corresponding valid cache entry 42 by the given hit-indicating cache lookup response.

For some examples, a given cache lookup command may trigger only a single cache lookup request to be sent to the cache. The cache lookup response filtering technique discussed above can still be useful for such caches, as it enables cache lookup requests to continue in parallel with processing of an in-progress cache invalidation command, without needing to delay acknowledgement of the cache invalidation command.

However, the filtering technique can be particularly useful for caches which can trigger multiple cache lookup requests from the same cache lookup command, for example based on different set indexing schemes for deriving set index values from the address specified by a particular cache lookup command. For example, this can be particularly useful for TLBs 14, 24, as the same cache structure within a TLB could be shared for use in caching information from different levels of page table which are typically indexed using different portions of address bits from an input address, and so identifying whether a given cache entry holds relevant cached information 46 for a particular input address may involve multiple separate lookups based on different set indices derived from the different portions of address bits of the input address. It is also possible that separate attempts to look up the cache may be performed for a number of different address range sizes corresponding to different values of the size information 50.

Figure 4:
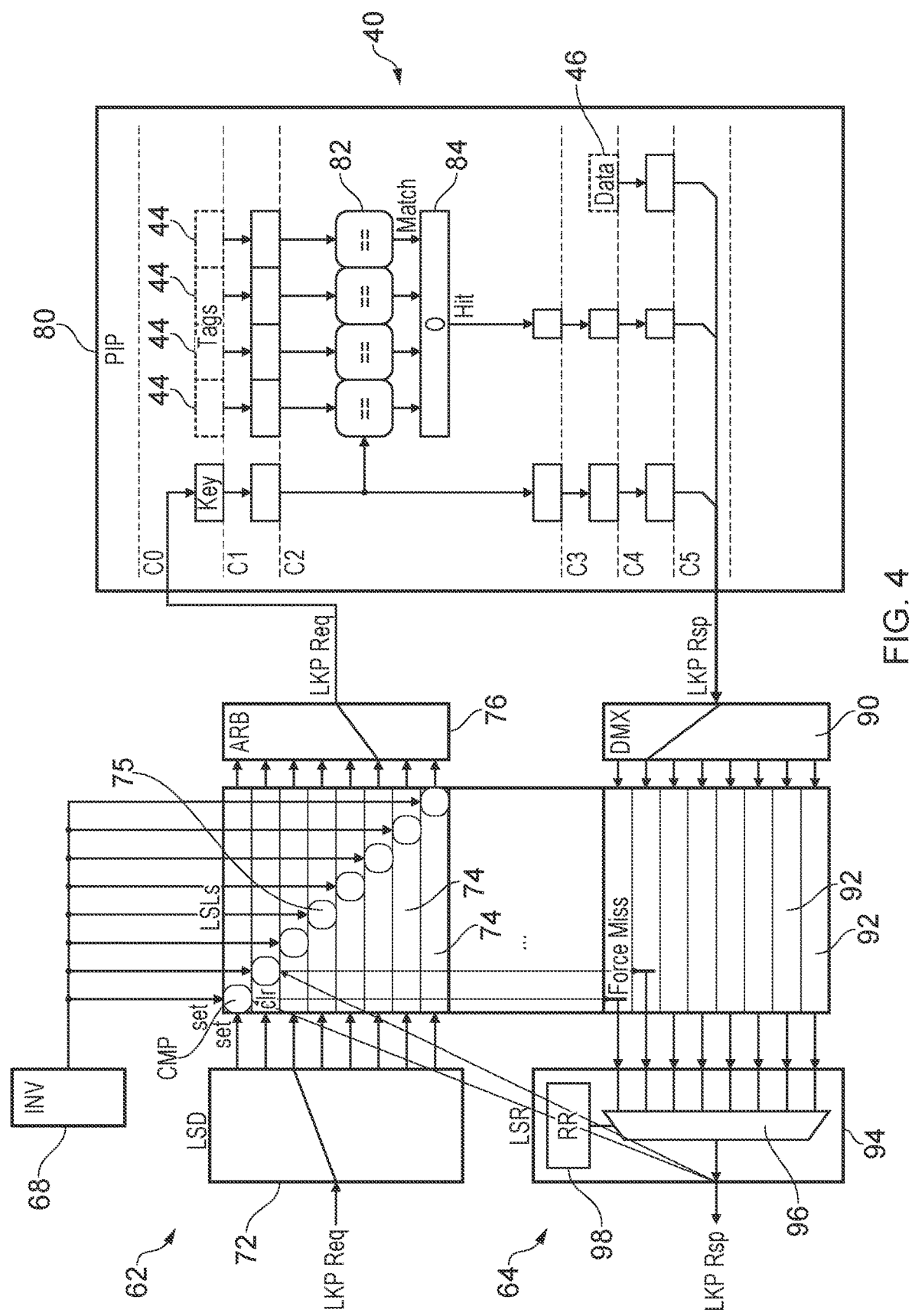
FIG. 4 illustrates, for comparison, an example in which comparisons for detecting conflict between cache lookup requests and an in-progress cache invalidation command are implemented on the cache lookup request path.

FIG. 4 illustrates an example of an incremental lookup scheme where one cache lookup command may spawn a hierarchical sequence of cache lookup requests all derived from the address information of the same cache lookup command. The cache lookup circuitry 62 includes a lookup slot dispatcher 72, a number of lookup slots 74 each for processing lookup requests for a respective cache lookup command, and an arbiter 76 for selecting lookup requests generated by respective lookup slots 74 are to be sent to the cache 40. Similarly, the cache lookup response circuitry 64 includes a demultiplexer 90 for demultiplexing lookup responses received from the cache 40 and allocating each response to a corresponding lookup response slot 92 associated with the lookup request slot 74 that sent the corresponding lookup request, and a lookup slot responder 94 for selecting, based on the lookup response processing by each lookup response slot 92, lookup response messages to be transmitted over the interface 60 to corresponding recipients. In some examples, the lookup slot responder 94 could be considered part of the cache lookup response interface 60 described in the example of FIG. 2. While FIG. 4 shows the lookup response slots 92 as separate from the lookup slots 74, other examples could combine a lookup response slot 92 and the corresponding lookup slot 74 into a single module.

Hence, when a new cache lookup request is received, the lookup slot dispatcher 72 selects an available lookup slot 74 (or waits for a lookup slot to become available, if none are currently available), and allocates the request to the selected lookup slot 74 (and a corresponding lookup response slot 92 is also allocated at this time). Each lookup slot 74 operates as a finite state machine (FSM) which steps through a series of states, corresponding to a hierarchical sequence of lookup requests based on different set indexing functions for deriving a set index specified as part of the address information. A given lookup slot 74 initially transmits a lookup request for a first set indexing scheme, and awaits the corresponding response from the cache 40. When the corresponding response is received from the cache, the demultiplexer 90 allocates this to the lookup response slot 92 which is associated with the lookup request slot 74 which sent the corresponding lookup request. If the cache lookup response received is a hit-indicating cache lookup response, a hit-indicating response message can be transmitted by the lookup slot responder 64 to the interface 60 for routing to a recipient. If the received cache lookup response is a miss-indicating cache lookup response, the lookup request slot 74 switches to its next FSM state, to generate another lookup request for the next set indexing scheme to be attempted. Hence, the incremental lookup is based on repeatedly attempting lookups for different set indexing schemes until either a hit-indicating cache lookup response is received (at which point the incrementing sequence terminates early so that it is not necessary to send subsequent lookup requests for remaining set indexing schemes in the sequence), or a miss-indicating cache lookup response is received in response to the final lookup request of the sequence, at which point the lookup slot responder 94 may control the interface 60 to return a miss-indicating cache lookup response message to at least one recipient.

The lookup request arbiter 76 may use any arbitration policy (e.g. round robin, least recently used, or priority-based arbitration) to arbitrate between lookup requests in cycles when more than one lookup request slot 74 issues a lookup request to be issued to the cache 40. Similarly, the lookup slot responder 94 comprises a multiplexer 96 which selects between lookup response messages transmitted by respective slots 92 to select which messages are returned via the interface 60 to recipients in a given cycle. In this example, the multiplexer 96 uses a round robin policy controlled by a round robin counter 98, to cycle through each lookup response slot 92 in turn. However, other policies could also be used by the lookup slot responder 94 to arbitrate between lookup response messages pending in the same cycle (e.g. least recently used policy or a priority based scheme could be used instead of round robin).

FIG. 4 also shows more detail for a cache lookup pipeline 80 of the cache 40, illustrating that a lookup to the cache may take multiple cycles, performed across a number of pipeline stages (with pipelined processing so that more than one lookup request can be in-flight in the pipeline simultaneously, at different pipeline stages). For example, a first pipeline stage C0 may use the set index (key) specified by the lookup request to select which set of entries should be looked up. A second pipeline stage C1 may read the cache tags 44 of that set of entries (as well as any other lookup information such as context information, and/or any lookup qualifying information such as a mask specified by size information 50 used to mask out address bits in a tag comparison). The tag comparison (and any other lookup information comparison) takes place in a third pipeline stage C2 using comparators 82 which output match signals for each looked up cache entry, and control logic 84 which determines from the match indications whether any hit has been detected, and if so which of the looked up entries is the corresponding entry that matches the required lookup information. At stage C3, the cached information 46 is read out from the corresponding entry and at stages C4, C5 the information from the cached entry is used to derive a corresponding lookup response which is returned to the cache lookup response circuitry 64. It will be appreciated that the particular pipeline layout is just one example and other arrangements are also possible.

Hence, FIG. 4 illustrates that an individual lookup request may take several cycles to process, and in an incremental lookup response where one lookup command may spawn many separate lookup requests, the total number of cycles during which a given lookup command remains in-flight may be significant (especially for commands which end up identifying a miss for all lookup requests, so get all the way to the last state in the FSM).

Therefore, both cache invalidations (which may require a slow cache walk operation to check every entry of the cache), and cache lookups (involving the incremental lookup scheme) can be slow multi-cycle operations, and so when a cache invalidation command is received, it would cause a significant impact on performance to delay either the acknowledgement of the cache invalidation command while awaiting completion of in-flight cache lookups, or delay cache lookups while processing the invalidation command.

It is therefore desirable that cache lookups can continue in parallel with an in-progress cache invalidation (recognizing that often there is no conflict between them), even if the recipient has already been sent the invalidation acknowledgment so that the cache 40 is committed to ensure that no cache hit response message is returned for an entry 42 which may subsequently be invalidated in a remaining part of the cache invalidation process.

FIG. 4 shows, for comparison, one approach for dealing with conflicts between cache lookups and cache validations. In this example, the conflict detection is implemented within each cache lookup slot 74, which include comparators 75 for comparing address information of the pending lookup commands in those cache lookup slots with the address information specified as invalidation scope information by the in-progress cache invalidation command held in buffer 68. If the address information potentially corresponds, so that for at least one potential value of the invalidation qualifying information 48 in a given cache entry an invalidation lookup might determine that the entry is within the scope of the invalidation command, the given lookup request slot 74 signals to the corresponding lookup response slots 92 that all cache lookup responses for that lookup response slot 92 should be demoted to a miss even if the cache pipeline 80 returned a hit-indicating cache lookup response. Hence, all responses to lookup requests that are in the scope of the in-progress cache invalidation are demoted to a miss, based on a comparison of the lookup request fields of the corresponding cache lookup command and the invalidation scope information of the invalidation command. However, such filtering is conservative and potentially over-invalidating, as the lookup request does not have the invalidation qualifying information 48 from particular cache entries which would be used for accurate determination of whether a particular entry actually needs to be invalidated. This conservatism can be harmful to performance as it can result in hits in entries which would not actually have been invalidated being treated as misses, triggering slower accesses to a further cache or memory which were not actually necessary as the cached information in the hit cache entry would have been valid and did not need invalidation.

Figure 5:
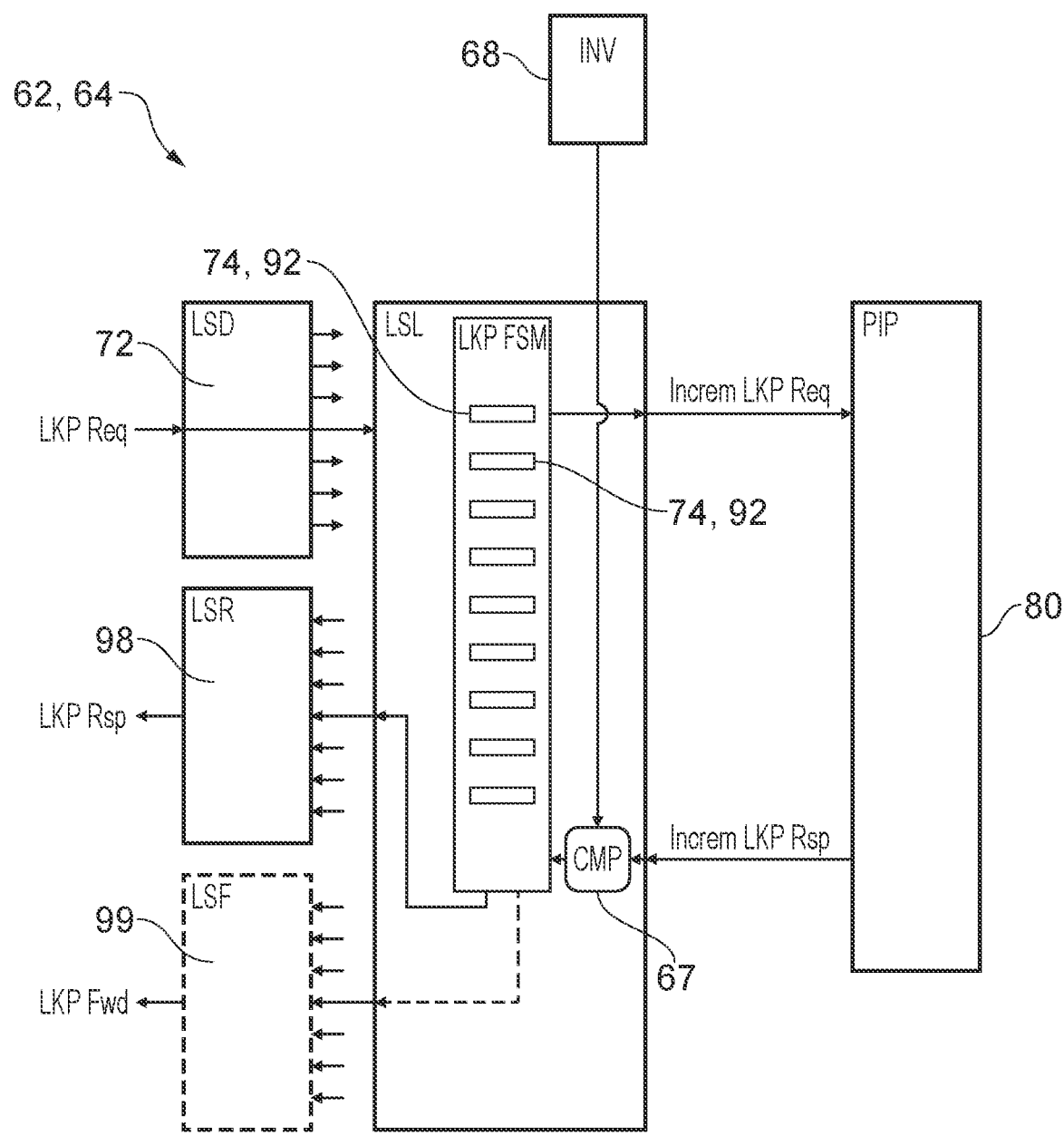
FIG. 5 illustrates an approach for providing cache lookup response filtering in an example which generates a hierarchical sequence of multiple cache lookup requests in response to a same cache lookup command.

FIG. 5 shows an improved approach, where the comparator 67 for filtering based on conflict with invalidations is moved onto the cache lookup response path, as in the approach shown in FIG. 2. FIG. 5 shows the cache lookup request slots 74 and cache lookup response slots 92 as combined FSM slots in this example, but in other examples they could still be implemented as separate slots as in the approach shown in FIG. 4. FIG. 5 for conciseness does not show the detail of the cache lookup pipeline 80, but this can be the same as in FIG. 4.

In the approach in FIG. 5, cache lookup requests are handled as in FIG. 4, being generated according to a hierarchical sequence requests where a request for a given set indexing scheme is triggered when a previous request for the same command returns a miss-indicating cache lookup response. However, unlike in FIG. 5, there is no comparison of cache request parameters against the invalidation scope information of an in-progress invalidation command at the time of generating the cache lookup requests. Instead, when a corresponding cache lookup response is received, if the response is a hit-indicating cache lookup response, that response returns not only the cached information 46 but also the invalidation qualifying information 48 (which may be unusual, as the invalidation qualifying information may not normally be considered relevant for a cache lookup response), and the comparator 67 can then compare the invalidation scope information of any in-progress cache invalidation command with information derived from the invalidation qualifying information in combination with any lookup information specified by the corresponding cache lookup request (e.g. address information and/or context information), to determine whether the hit-indicating cache lookup response conflicts with the in-progress cache invalidation command. If a conflict is detected then the hit-indicating cache lookup response is demoted to a miss, but this does not need to affect all the cache lookup responses triggered in the incremental sequence for a given cache lookup command as it is still possible that a subsequent lookup request for the same cache lookup command could return a hit which does not conflict with the in-progress cache invalidation command and so can remain treated as a hit and cause a hit response message to be routed over the interface 60.

Hence, the invalidation comparison can be more accurate by considering the invalidation qualifying information 48, so that the risk of false positive conflict detections can be lower and so the performance impact reduced.

In the example of FIG. 5, two separate lookup slot responders 98, 99 are provided, rather than one 98 as in FIG. 4. For example, the first lookup slot responder 98 may handle transmission of cache hit response messages, while the second lookup slot responder 99 may handle transmission of cache miss response messages (this is useful as sometimes the recipients for a hit response and a miss response may be different and so the responders 98, 99 may have different credit schemes for determining when the respective hit/miss recipients are available to receive another message). However, it will be appreciated that the second lookup slot responder 99 is optional, and other examples may provide a single lookup slot responder 98 which handles both hit and miss response messages.

When a back-pressure mechanism is implemented at the interface 60 and/or the lookup slot responder 98, 99, there is a possibility that having identified a hit in the cache 40 which has not been demoted to a miss due to any conflict with an in-progress cache invalidation 68, the corresponding hit response message cannot immediately be transmitted over the interface 60 to its recipient due to insufficient credit in the back-pressure mechanism. While waiting for a credit to become available, a new cache invalidation command could be received and acknowledged to a recipient, creating an obligation not to forward any further hit responses based on entries which might be in the scope of the new cache invalidation command. While one approach could be to delay acknowledgement of the new cache invalidation command until any pending cache hit response messages have been returned to their recipients, in practice this may take some time and creates a dependency of the invalidation acknowledgement on the availability of the recipients of the cache lookup response messages. This may be undesirable.

Instead, the lookup slot responder 98 may operate a scheme where it is possible for the lookup response slots 92 in the cache lookup response circuitry 64 to withdraw a request for the lookup slot responder 98 (and hence the response interface 60) to transmit a hit-indicating cache response message, at any time until the hit-indicating cache response message has actually progressed beyond a certain point of being transmitted to its recipient. Hence, if a new invalidation command is received and is deemed to conflict with a hit-indicating cache lookup response which previously passed the conflict check but is now deemed conflicting due to the newly received cache invalidation command, and the corresponding cache hit response message has not yet been transmitted due to insufficient availability of its recipient, then the cache hit response message can be withdrawn from being issued over the interface 60.

Figure 6:
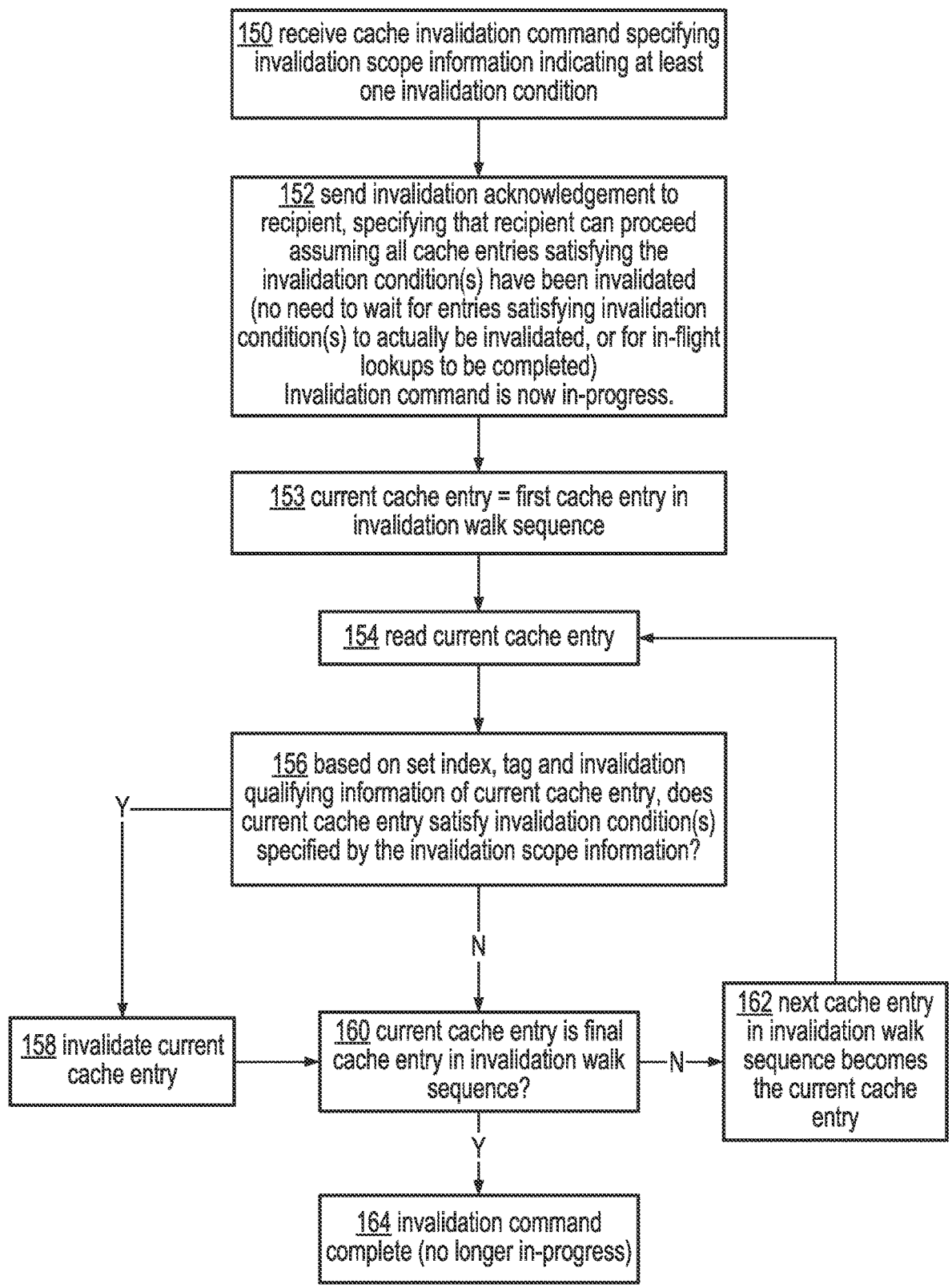
FIG. 6 illustrates processing of a cache invalidation command.

FIG. 6 is a flow diagram illustrating processing of a cache invalidation command by cache invalidation circuitry 70. At step 150, the cache invalidation command is received from a requester. The cache invalidation command specifies invalidation scope information indicating at least one invalidation condition to be satisfied by any cache entries to be invalidated. At step 152, the cache invalidation circuitry 70 causes the interface 60 to transmit an invalidation acknowledgement to a recipient, specifying that the recipient can proceed assuming that all cache entries satisfy the invalidation condition(s) defined by the invalidation scope information have been invalidated. There is no need for the cache invalidation circuitry 72 wait for the entries satisfying the invalidation condition(s) to actually be invalidated, or for any in-flight lookups to be completed, before transmitting the invalidation acknowledgement. Hence, the invalidation acknowledgement may signal to any recipient of the acknowledgement that the invalidation can be treated as having taken effect, even if all the required invalidations have not yet been carried out. Having sent the invalidation acknowledgement, the invalidation command can now be treated as an in-progress cache invalidation command.

At step 153, an invalidation walk sequence starts, which involves cycling through each cache entry to check whether it satisfies the invalidation condition(s). Each iteration of the walk sequence is performed on a current cache entry, which for the initial iteration is the first cache entry in the cache storage 41. At step 154, the cache invalidation circuitry 70 triggers a read of the current cache entry. At step 156, the cache invalidation circuitry determines based on a set index associated with the current cache entry and the cache tag 44 and invalidation qualifying information 48 of the current cache entry (and optionally based on other information from the current cache entry, such as context information), whether the current cache entry satisfies the one or more invalidation conditions specified by the invalidation scope information of the in-progress cache invalidation command. For example, the invalidation conditions may include an address-based condition which is satisfied if address information specified in the invalidation scope information defines one or more addresses which intersect with any address in a region identified based on the set index, tag 44 and invalidation qualifying information 48. For example, the invalidation qualifying information 48 may be used to mask out bits of an address derived from the set index and tag 44, for comparison with an address specified by invalidation scope information (the address specified by the invalidation scope information may similarly be masked based on range information identifying the size of the address range for which the invalidation is required). Optionally, other conditions may also be applied in the invalidation, such as comparisons of context information and/or type of cached information.

If the cache invalidation circuitry 70 determines that the current cache entry satisfies the one or more invalidation conditions specified by the invalidation scope information, then at step 158 the current cache entry is invalidated. Step 158 is omitted if the current cache entry does not satisfy the one or more invalidation conditions.

At step 160, the cache invalidation circuitry 70 determines whether the current cache entry is the final cache entry to be checked in the invalidation walk sequence, and if not then at step 162 the next cache entry in the invalidation walk sequence becomes the current cache entry, and the method returns to step 154 for a further iteration of the invalidation walk sequence. On the other hand, if the current cache entry is the final cache entry to be checked, then there are no cache entries left to check and at step 164 the processing of the cache invalidation command is complete (and the cache invalidation command is no longer considered to be an in-progress cache invalidation command).

It will be appreciated that while FIG. 6 shows sequential checking of each cache entry in the invalidation walk sequence, it would also be possible to perform the invalidation checks for multiple entries in parallel, to speed up the invalidation walk. Nevertheless, often the number of cache entries 42 that can be checked in parallel may be smaller than the total number of entries to be checked, and so the invalidation walk process may still take many cycles.

Figure 7:
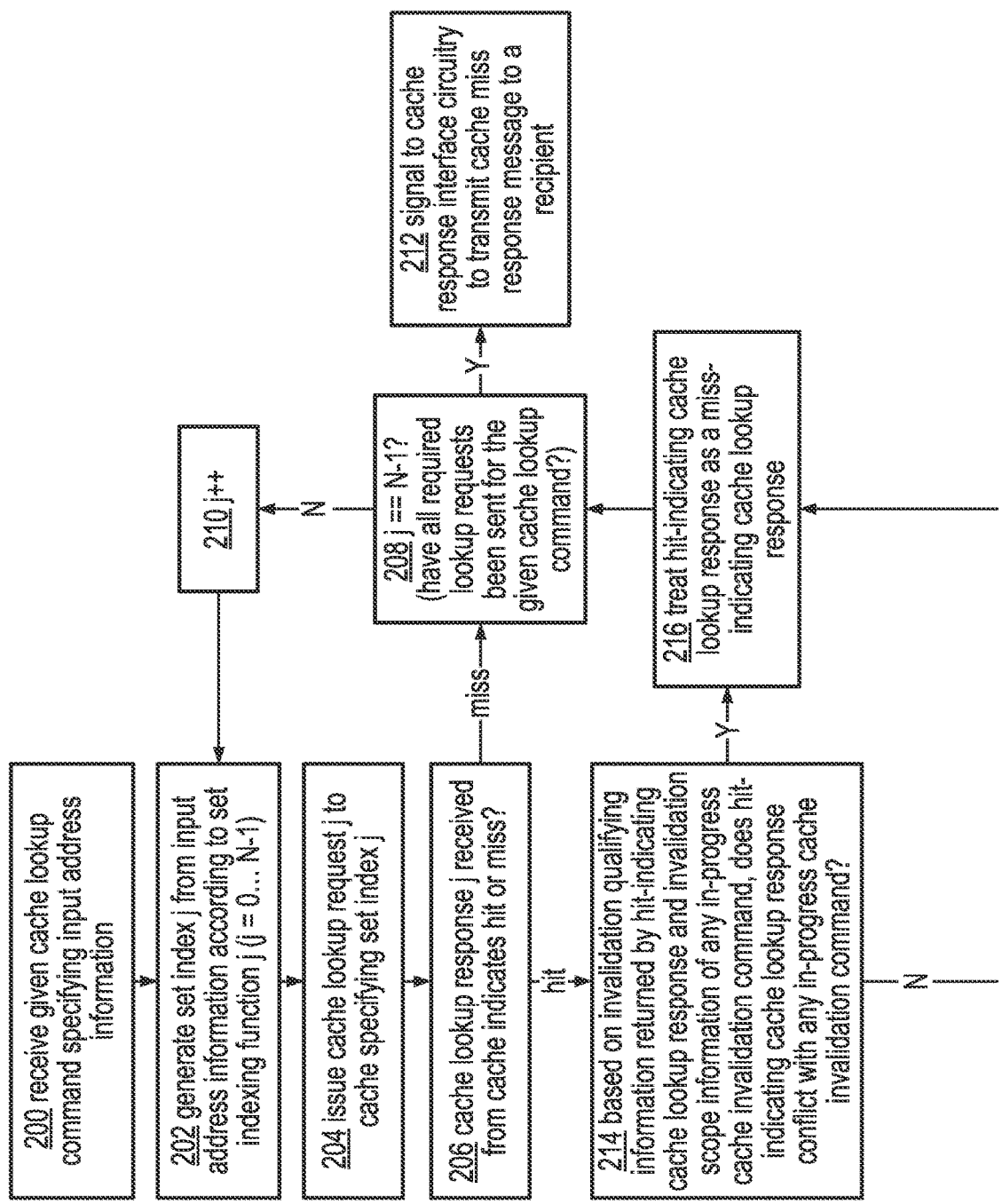
FIG. 7 illustrates processing of a cache lookup command.
Figure 7:
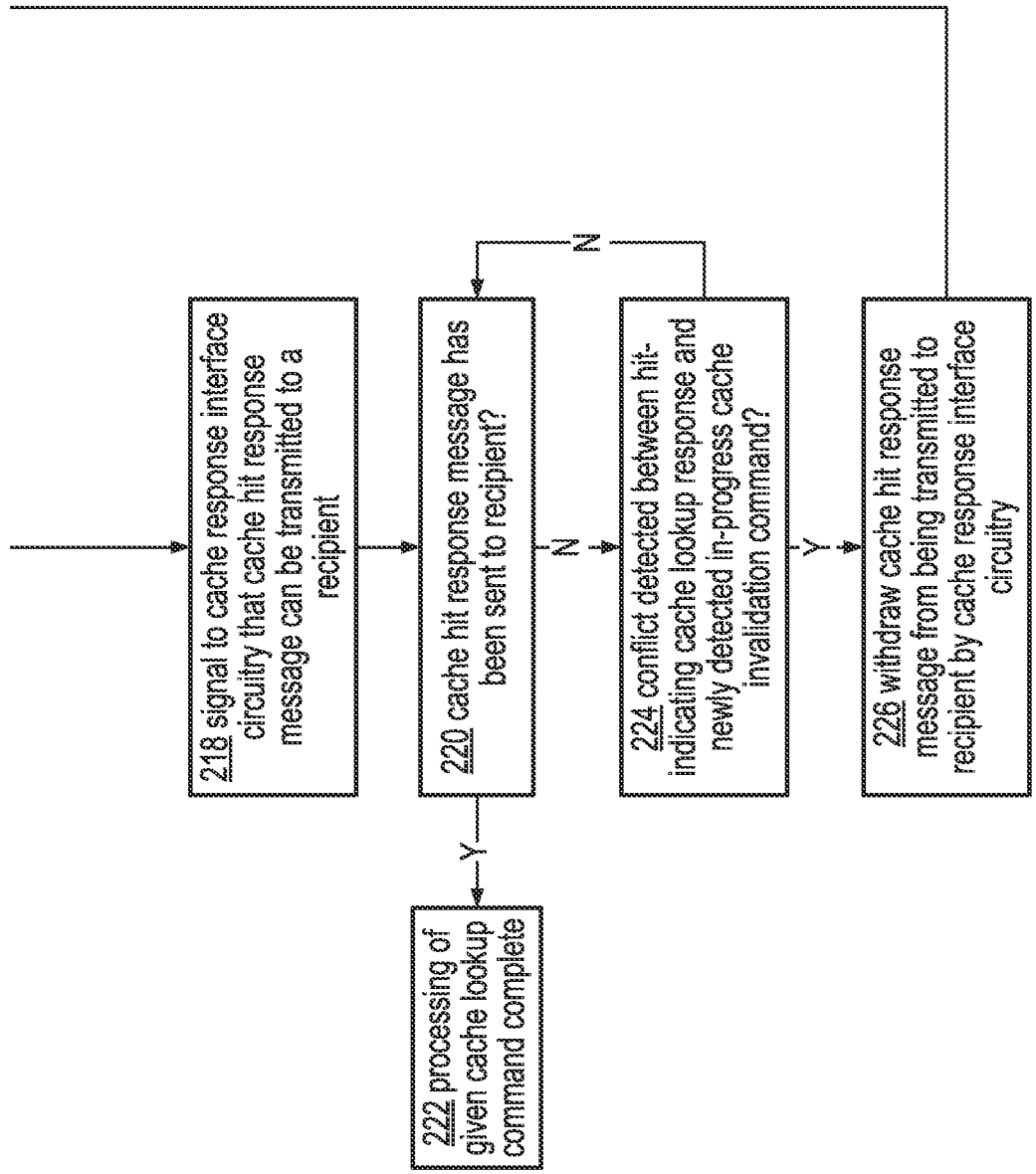

FIG. 7 is a flow diagram showing an example method of processing cache lookup commands, based on the approach shown in FIG. 5. At step 200, a given cache lookup command is received at the interface 60 specifying input address information. The cache lookup command is allocated to one of the cache lookup request slots 74 of cache lookup circuitry 62. At step 202, the cache lookup request slot 74 allocated for the given cache lookup command generates set index j from the input address information according to a certain set indexing function j (selected from N different set indexing functions for j=0 . . . . N−1). In the first cycle of generating a lookup request, j=0. At step 204, the cache lookup request slot 74 issues a cache lookup request j to the cache 40 specifying the set index j as address information (and also specifying other information such as a lookup tag value derived from the input address information and any other lookup information such as context identifiers). At step 206, a corresponding lookup response slot 92 of the cache lookup response circuitry 64 determines whether the cache lookup response j received from the cache 40 in response to cache lookup request j indicates a cache hit or a cache miss. If cache lookup response j is a miss-indicating cache lookup response, then at step 208 the cache lookup circuitry 62 determines whether all required lookup requests have already been sent for the given cache lookup command (i.e. whether j=N−1, where N is the maximum number of different lookup requests that could be sent for one cache lookup command, corresponding to the number of different set indexing schemes in use). If j<N−1, then there is still another cache lookup request to be sent, and so at step 210 j is incremented and the method returns to step 202 to generate another set index for a further lookup request, and iterate through steps 202, 204, 206 once more. If j=N−1, then all the required lookup requests have already been sent, and have all returned miss-indicating cache lookup responses (or have been treated as misses due to conflict with an invalidation command), and so at step 212 the cache lookup response circuitry 64 signals to the cache response interface circuitry 60 to transmit a cache miss response message to a recipient.

On the other hand, if at step 206 the cache lookup response j for a given iteration j of the hierarchical sequence of lookup requests was a hit-indicating cache lookup response, then at step 214 the cache lookup filtering circuitry 66 determines, based on invalidation qualifying information 48 returned by the hit-indicating cache lookup response and the invalidation scope information of any in-progress cache invalidation command, whether the hit-indicating cache lookup response conflicts with the in-progress cache invalidation command. It will be appreciated that the particular rules for determining whether there is conflict between the hit-indicating cache lookup response and the invalidation scope information will depend on the particular cache implementation and the particular invalidation conditions imposed by the invalidation, so a wide variety of checks can be included here.

If conflict is detected between the hit-indicating cache lookup response and the in-progress cache invalidation command, then at step 216 the hit-indicating cache lookup response is treated as a miss-indicating cache lookup response, and the method returns to step 208 to continue as if a miss-indicating cache lookup response had actually been received at step 206, in the same way as already described above. Hence, the cache lookup request slot 74 may continue to step through its FSM to issue further requests according to the incremental lookup scheme, or if all set indexing schemes have already been tried, a cache miss response may be signalled via the interface 60 at step 212.

If no conflict is detected between the hit-indicating cache lookup response and any in-progress cache invalidation command, then at step 218 the cache lookup response circuitry 64 signals to the cache response interface circuitry 60 that it can transmit a cache hit response message to a recipient (which could be the same recipient that would receive the cache miss response message at step 212, or could be a different recipient to the recipient that would receive the cache miss response message).

At step 220, the cache lookup response filtering circuitry 66 awaits confirmation that the cache hit response message has been sent to the recipient (which can be delayed if the recipient is not available so that there is insufficient credit available for the cache response interface circuitry 60 to transmit the cache hit response message). Once the cache hit response message has been sent to the recipient, then at step 222 processing of the given cache lookup command is complete and the corresponding cache lookup request slot 74 and cache lookup response slot 92 can be reallocated for a different cache lookup command.

If the cache hit response message has not yet been sent to the recipient, but at step 224 the cache lookup response filtering circuitry 66 detects conflict between the hit-indicating cache lookup response received at step 206 and a newly detected in-progress cache invalidation command (which was not yet in progress at the time the cache lookup response previously passed the conflict check at step 214), then at step 226 the filtering circuitry 66 in the cache lookup response circuitry 64 withdraws the cache hit response message from being transmitted to the recipient by the cache response interface circuitry 60, and the method returns to step 216 to treat the corresponding hit-indicating cache lookup response for iteration j as a miss-indicating cache lookup response, as explained earlier. Hence, by allowing for cache hit response messages to be withdrawn after having been requested, this reduces the complexity of handling newly received cache invalidation commands, as there is no need to introduce dependency on the state of the interface 60 in the control flow for processing invalidation commands.

While FIG. 7 illustrates processing of a single cache lookup command, it will be appreciated that multiple cache lookup request/response slots 74, 92 may be provided to enable parallel processing of multiple cache lookup commands. Hence, one cache lookup command could be as a different iteration of the FSM compared to another.

Also, it will be appreciated that for the flow diagrams described above, while a particular order of the steps is shown, it is possible to reorder some steps or perform some steps at least partially in parallel.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 8:
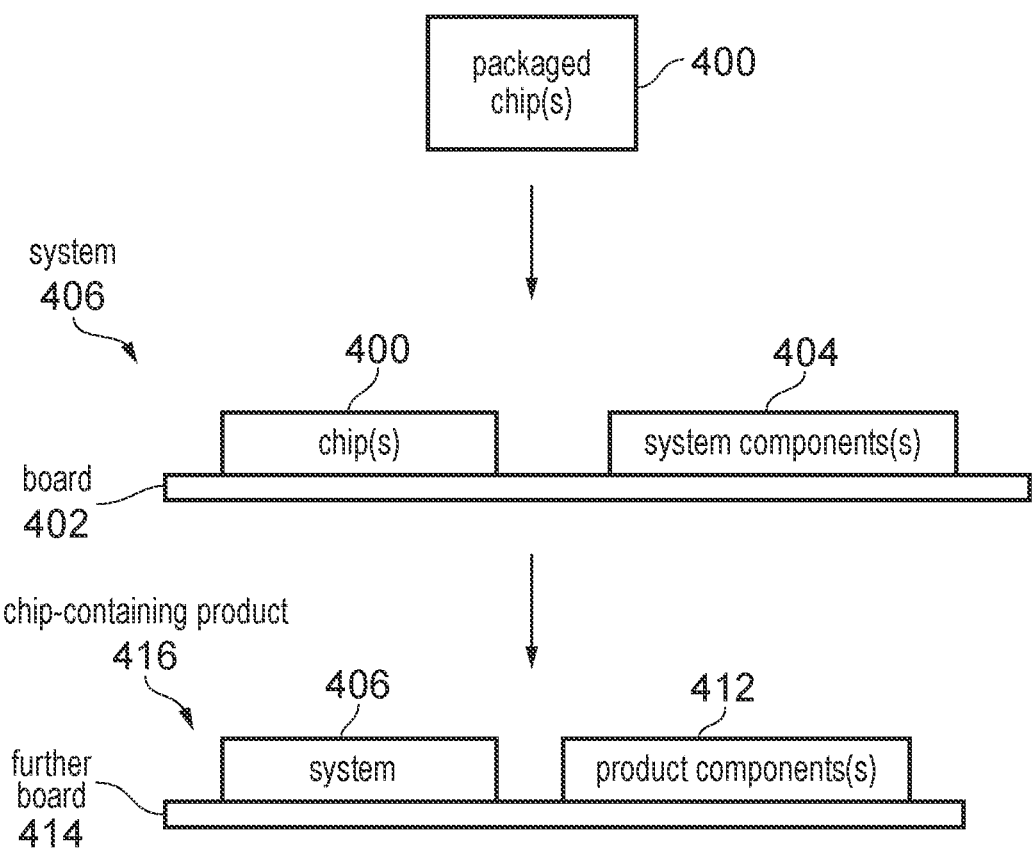
FIG. 8 illustrates a system and a chip-containing product.

As shown in FIG. 8, one or more packaged chips 400, with the apparatus described above implemented on one chip or distributed over two or more of the chips, are manufactured by a semiconductor chip manufacturer. In some examples, the chip product 400 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 400 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 400 are assembled on a board 402 together with at least one system component 404 to provide a system 406. For example, the board may comprise a printed circuit board. The board substrate may be made of any of a variety of materials, e.g. plastic, glass, ceramic, or a flexible substrate material such as paper, plastic or textile material. The at least one system component 404 comprise one or more external components which are not part of the one or more packaged chip(s) 400. For example, the at least one system component 404 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 416 is manufactured comprising the system 406 (including the board 402, the one or more chips 400 and the at least one system component 404) and one or more product components 412. The product components 412 comprise one or more further components which are not part of the system 406. As a non-exhaustive list of examples, the one or more product components 412 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 406 and one or more product components 412 may be assembled on to a further board 414.

The board 402 or the further board 414 may be provided on or within a device housing or other structural support (e.g. a frame or blade) to provide a product which can be handled by a user and/or is intended for operational use by a person or company.

The system 406 or the chip-containing product 416 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc.

An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. An apparatus comprising:
    cache invalidation circuitry responsive to a cache invalidation command specifying invalidation scope information indicative of at least one invalidation condition, to control a cache to perform an invalidation process to invalidate cache entries satisfying the at least one invalidation condition, a given cache entry specifying cached information and invalidation qualifying information for use in determining whether the given cache entry satisfies the at least one invalidation condition;
    cache lookup circuitry to issue to the cache a cache lookup request specifying address information, to request that the cache returns a cache lookup response; and
    cache lookup response filtering circuitry responsive to a given hit-indicating cache lookup response which provides the cached information and the invalidation qualifying information returned from a corresponding valid cache entry corresponding to the address information specified by a given cache lookup request, to:
        determine whether the given hit-indicating cache lookup response conflicts with an in-progress cache invalidation command, based on the invalidation scope information specified by the in-progress cache invalidation command and the invalidation qualifying information returned from the corresponding valid cache entry by the given hit-indicating cache lookup response; and
        in response to determining that the given hit-indicating cache lookup response conflicts with the in-progress cache invalidation command, cause the given hit-indicating cache lookup response to be treated as a miss-indicating cache lookup response indicating that the cache does not comprise any valid cache entry corresponding to the address information of the given cache lookup request.
2. The apparatus according to clause 1, in which the invalidation qualifying information for the given cache entry comprises size information indicative of a size of an address range to which the cached information is applicable.
3. The apparatus according to clause 1 or 2, in which the invalidation qualifying information for the given cache entry comprises invalidation range information indicative of an invalidation range of addresses associated with the given cache entry, where for at least one type of cache invalidation command the invalidation scope information specifies a set of one or more invalidation target addresses and the at least one invalidation condition comprises an address-based invalidation condition which is satisfied by the given cache entry when the set of one or more invalidation target addresses intersects with the invalidation range of addresses associated with the given cache entry.
4. The apparatus according to any of clauses 1 to 3, in which the cache lookup circuitry is responsive to a cache lookup command received at a cache lookup command interface, to trigger issuing of a plurality of cache lookup requests to the cache based on the same cache lookup command.
5. The apparatus according to clause 4, in which each of the plurality of cache lookup requests specifies a respective set index derived from input address information specified by the cache lookup command, the set index specifying which set of cache entries of the cache is to be looked up for that cache lookup request to determine whether any of that set of cache entries is the corresponding valid cache entry; and
    for each of the plurality of cache lookup requests based on the same cache lookup command, the cache lookup circuitry is configured to generate the set index based on a different set indexing function for deriving the set index from the input address information.
6. The apparatus according to clause 4 or 5, in which the cache lookup circuitry is configured to issue the plurality of cache lookup requests as a hierarchical sequence of cache lookup requests, where the cache lookup circuitry is configured to trigger issuing of a next cache lookup request of the hierarchical sequence to the cache in response to detecting the miss-indicating cache lookup response being returned by the cache as a response to a previous lookup request in the hierarchical sequence.
7. The apparatus according to clause 6, in which in response to the given hit-indicating cache lookup response being treated as the miss-indicating cache lookup response due to conflict with the in-progress cache invalidation command when the given hit-indicating cache lookup response is received in response to one of the plurality of cache lookup requests other than a final cache lookup request in the hierarchical sequence, the cache lookup circuitry is configured to issue the next cache lookup request of the hierarchical sequence to the cache.
8. The apparatus according to clause 6 or 7, in which, for the plurality of cache lookup requests in the hierarchical sequence generated in response to the same cache lookup command, the cache lookup response filtering circuitry is capable of determining that a first hit-indicating cache lookup response received in response to one cache lookup request of the hierarchical sequence conflicts with the in-progress cache invalidation command but a second hit-indicating cache lookup response received in response to another cache lookup request of the hierarchical sequence does not conflict with the in-progress cache invalidation command.

9. The apparatus according to clause 6 to 8, comprising cache response interface circuitry to transmit a cache miss response message to a recipient, in response to the cache lookup response filtering circuitry determining that a final cache lookup response received from the cache in response to a final cache lookup request of the hierarchical sequence is either the miss-indicating cache lookup response or is the hit-indicating cache lookup response treated as the miss-indicating cache lookup response due to conflict with the in-progress cache invalidation command.

10. The apparatus according to any of clauses 1 to 9, comprising cache response interface circuitry to transmit a cache hit response message to a recipient, in response to the cache lookup response filtering circuitry determining that the hit-indicating cache lookup response was received from the cache in response to a cache lookup request, where the hit-indicating cache lookup response is not determined to conflict with any in-progress cache invalidation command.

11. The apparatus according to clause 10, in which the cache response interface circuitry is configured to implement a back-pressure mechanism to defer transmission of a message to the recipient when the recipient is not available to receive the message.

12. The apparatus according to clause 10 or 11, in which in response to the cache lookup response filtering circuitry detecting a new in-progress cache invalidation command which conflicts with a transmission-pending hit-indicating cache lookup response which was previously determined not to be conflicting with any in-progress cache invalidation command but for which a corresponding cache hit response message is yet to be transmitted to the recipient by the cache response interface circuitry, the cache lookup response filtering circuitry is configured to withdraw the cache hit response message from being transmitted to the recipient.

13. The apparatus according to any of clauses 1 to 12, in which the cache invalidation circuitry is configured to send an invalidation acknowledgement to a recipient in response to the cache invalidation command, the invalidation acknowledgement specifying to the recipient that the recipient can proceed assuming that all cache entries of the cache satisfying the at least one invalidation condition have been invalidated.

14. The apparatus according to clause 13, in which the cache invalidation circuitry is configured to send the invalidation acknowledgement to the recipient before it is guaranteed that all cache entries of the cache satisfying the at least one invalidation condition have been invalidated.

15. The apparatus according to clause 13 or 14, in which the in-progress cache invalidation request comprises a cache invalidation request for which the invalidation acknowledgement has already been sent to the recipient but for which it is not yet guaranteed that all cache entries of the cache satisfying the at least one invalidation condition have been invalidated.

16. The apparatus according to any of clauses 13 to 15, in which the cache invalidation circuitry is configured to send the invalidation acknowledgement to the recipient before completing cache lookup requests for any in-progress cache lookup command which was in progress before the cache invalidation command was received.

17. The apparatus according to any preceding clause, in which the cache comprises a translation lookaside buffer, for which the cached information comprises address translation information derived from one or more translation tables.

18. A system comprising:
    the apparatus of any of clauses 1 to 17, implemented in at least one packaged chip;
    at least one system component; and
    a board,
    wherein the at least one packaged chip and the at least one system component are assembled on the board.

19. A chip-containing product comprising the system of clause 18 assembled on a further board with at least one other product component.

20. A non-transitory computer-readable medium to store computer-readable code for fabrication of an apparatus comprising:
    cache invalidation circuitry responsive to a cache invalidation command specifying invalidation scope information indicative of at least one invalidation condition, to control a cache to perform an invalidation process to invalidate cache entries satisfying the at least one invalidation condition, a given cache entry specifying cached information and invalidation qualifying information for use in determining whether the given cache entry satisfies the at least one invalidation condition;
    cache lookup circuitry to issue to the cache a cache lookup request specifying address information, to request that the cache returns a cache lookup response; and
    cache lookup response filtering circuitry responsive to a given hit-indicating cache lookup response which provides the cached information and the invalidation qualifying information returned from a corresponding valid cache entry corresponding to the address information specified by a given cache lookup request, to:
        determine whether the given hit-indicating cache lookup response conflicts with an in-progress cache invalidation command, based on the invalidation scope information specified by the in-progress cache invalidation command and the invalidation qualifying information returned from the corresponding valid cache entry by the given hit-indicating cache lookup response; and
        in response to determining that the given hit-indicating cache lookup response conflicts with the in-progress cache invalidation command, cause the given hit-indicating cache lookup response to be treated as a miss-indicating cache lookup response indicating that the cache does not comprise any valid cache entry corresponding to the address information of the given cache lookup request.

21. A method comprising:
    in response to a cache invalidation command specifying invalidation scope information indicative of at least one invalidation condition, controlling a cache to perform an invalidation process to invalidate cache entries satisfying the at least one invalidation condition, a given cache entry specifying cached information and invalidation qualifying information for use in determining whether the given cache entry satisfies the at least one invalidation condition;

issuing to the cache a cache lookup request specifying address information, to request that the cache returns a cache lookup response; and in response to a given hit-indicating cache lookup response which provides the cached information and the invalidation qualifying information returned from a corresponding valid cache entry corresponding to the address information specified by a given cache lookup request:

determining whether the given hit-indicating cache lookup response conflicts with an in-progress cache invalidation command, based on the invalidation scope information specified by the in-progress cache invalidation command and the invalidation qualifying information returned from the corresponding valid cache entry by the given hit-indicating cache lookup response; and in response to determining that the given hit-indicating cache lookup response conflicts with the in-progress cache invalidation command, causing the given hit-indicating cache lookup response to be treated as a miss-indicating cache lookup response indicating that the cache does not comprise any valid cache entry corresponding to the address information of the given cache lookup request.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
cache invalidation circuitry responsive to a cache invalidation command specifying invalidation scope information indicative of at least one invalidation condition, to control a cache to perform an invalidation process to invalidate cache entries satisfying the at least one invalidation condition,
wherein a given cache entry specifies cached information, address tag information indicative of which address corresponds to the cached information of the given cache entry, and, separate from the address tag information, invalidation qualifying information for use in determining whether the given cache entry satisfies the at least one invalidation condition;
cache lookup circuitry configured to issue to the cache a cache lookup request specifying address information, to request that the cache returns a cache lookup response; and
cache lookup response filtering circuitry responsive to a given hit-indicating cache lookup response which provides the cached information and the invalidation qualifying information returned from a corresponding valid cache entry corresponding to the address information specified by a given cache lookup request, to:
determine whether the given hit-indicating cache lookup response conflicts with an in-progress cache invalidation command, based on the invalidation scope information specified by the in-progress cache invalidation command and the invalidation qualifying information returned from the corresponding valid cache entry by the given hit-indicating cache lookup response; and
in response to determining that the given hit-indicating cache lookup response conflicts with the in-progress cache invalidation command, cause the given hit-indicating cache lookup response to be treated as a miss-indicating cache lookup response indicating that the cache does not comprise any valid cache entry corresponding to the address information of the given cache lookup request.

2. The apparatus according to claim 1, in which the invalidation qualifying information for the given cache entry comprises size information indicative of a size of an address range to which the cached information is applicable.

3. The apparatus according to claim 1, in which the invalidation qualifying information for the given cache entry comprises invalidation range information indicative of an invalidation range of addresses associated with the given cache entry, where for at least one type of cache invalidation command the invalidation scope information specifies a set of one or more invalidation target addresses and the at least one invalidation condition comprises an address-based invalidation condition which is satisfied by the given cache entry when the set of one or more invalidation target addresses intersects with the invalidation range of addresses associated with the given cache entry.

4. The apparatus according to claim 1, in which the cache lookup circuitry is responsive to a cache lookup command received at a cache lookup command interface, to trigger issuing of a plurality of cache lookup requests to the cache based on the same cache lookup command.

5. The apparatus according to claim 4, in which each of the plurality of cache lookup requests specifies a respective set index derived from input address information specified by the cache lookup command, the set index specifying which set of cache entries of the cache is to be looked up for that cache lookup request to determine whether any of that set of cache entries is the corresponding valid cache entry; and
for each of the plurality of cache lookup requests based on the same cache lookup command, the cache lookup circuitry is configured to generate the set index based on a different set indexing function for deriving the set index from the input address information.

6. The apparatus according to claim 4, in which the cache lookup circuitry is configured to issue the plurality of cache lookup requests as a hierarchical sequence of cache lookup requests, where the cache lookup circuitry is configured to trigger issuing of a next cache lookup request of the hierarchical sequence to the cache in response to detecting the miss-indicating cache lookup response being returned by the cache as a response to a previous lookup request in the hierarchical sequence.

7. The apparatus according to claim 6, in which in response to the given hit-indicating cache lookup response being treated as the miss-indicating cache lookup response due to conflict with the in-progress cache invalidation command when the given hit-indicating cache lookup response is received in response to one of the plurality of cache lookup requests other than a final cache lookup request in the hierarchical sequence, the cache lookup circuitry is configured to issue the next cache lookup request of the hierarchical sequence to the cache.

8. The apparatus according to claim 6, in which, for the plurality of cache lookup requests in the hierarchical sequence generated in response to the same cache lookup command, the cache lookup response filtering circuitry is capable of determining that a first hit-indicating cache lookup response received in response to one cache lookup request of the hierarchical sequence conflicts with the in-progress cache invalidation command but a second hit-indicating cache lookup response received in response to another cache lookup request of the hierarchical sequence does not conflict with the in-progress cache invalidation command.

9. The apparatus according to claim 6, comprising cache response interface circuitry to transmit a cache miss response message to a recipient, in response to the cache lookup response filtering circuitry determining that a final cache lookup response received from the cache in response to a final cache lookup request of the hierarchical sequence is either the miss-indicating cache lookup response or is the hit-indicating cache lookup response treated as the miss-indicating cache lookup response due to conflict with the in-progress cache invalidation command.

10. The apparatus according to claim 1, comprising cache response interface circuitry to transmit a cache hit response message to a recipient, in response to the cache lookup response filtering circuitry determining that the hit-indicating cache lookup response was received from the cache in response to a cache lookup request, where the hit-indicating cache lookup response is not determined to conflict with any in-progress cache invalidation command.

11. The apparatus according to claim 10, in which the cache response interface circuitry is configured to implement a back-pressure mechanism to defer transmission of a message to the recipient when the recipient is not available to receive the message.

12. The apparatus according to claim 10, in which in response to the cache lookup response filtering circuitry detecting a new in-progress cache invalidation command which conflicts with a transmission-pending hit-indicating cache lookup response which was previously determined not to be conflicting with any in-progress cache invalidation command but for which a corresponding cache hit response message is yet to be transmitted to the recipient by the cache response interface circuitry, the cache lookup response filtering circuitry is configured to withdraw the cache hit response message from being transmitted to the recipient.

13. The apparatus according to claim 1, in which the cache comprises a translation lookaside buffer, for which the cached information comprises address translation information derived from one or more translation tables.

14. A system comprising:
the apparatus of claim 1, implemented in at least one packaged chip;
at least one system component; and
a board,
wherein the at least one packaged chip and the at least one system component are assembled on the board.

15. A chip-containing product comprising the system of claim 14 assembled on a further board with at least one other product component.

16. A non-transitory computer-readable medium to store computer-readable code for fabrication of the apparatus according to claim 1.

17. An apparatus comprising:
cache invalidation circuitry responsive to a cache invalidation command specifying invalidation scope information indicative of at least one invalidation condition, to control a cache to perform an invalidation process to invalidate cache entries satisfying the at least one invalidation condition, a given cache entry specifying cached information and invalidation qualifying information for use in determining whether the given cache entry satisfies the at least one invalidation condition;
cache lookup circuitry configured to issue to the cache a cache lookup request specifying address information, to request that the cache returns a cache lookup response; and
cache lookup response filtering circuitry responsive to a given hit-indicating cache lookup response which provides the cached information and the invalidation qualifying information returned from a corresponding valid cache entry corresponding to the address information specified by a given cache lookup request, to:
determine whether the given hit-indicating cache lookup response conflicts with an in-progress cache invalidation command, based on the invalidation scope information specified by the in-progress cache invalidation command and the invalidation qualifying information returned from the corresponding valid cache entry by the given hit-indicating cache lookup response; and
in response to determining that the given hit-indicating cache lookup response conflicts with the in-progress cache invalidation command, cause the given hit-indicating cache lookup response to be treated as a miss-indicating cache lookup response indicating that the cache does not comprise any valid cache entry corresponding to the address information of the given cache lookup request;
in which the cache invalidation circuitry is configured to send an invalidation acknowledgement to a recipient in response to the cache invalidation command, the invalidation acknowledgement specifying to the recipient that the recipient can proceed assuming that all cache entries of the cache satisfying the at least one invalidation condition have been invalidated.

18. The apparatus according to claim 17, in which the cache invalidation circuitry is configured to send the invalidation acknowledgement to the recipient before it is guaranteed that all cache entries of the cache satisfying the at least one invalidation condition have been invalidated.

19. The apparatus according to claim 17, in which the cache invalidation circuitry is configured to send the invalidation acknowledgement to the recipient before completing cache lookup requests for any in-progress cache lookup command which was in progress before the cache invalidation command was received.

20. A method comprising:
in response to a cache invalidation command specifying invalidation scope information indicative of at least one invalidation condition, controlling a cache to perform an invalidation process to invalidate cache entries satisfying the at least one invalidation condition, wherein a given cache entry specifies cached information, address tag information indicative of which address corresponds to the cached information of the given cache entry, and, separate from the address tag information, invalidation qualifying information for use in determining whether the given cache entry satisfies the at least one invalidation condition;

issuing to the cache a cache lookup request specifying address information, to request that the cache returns a cache lookup response; and in response to a given hit-indicating cache lookup response which provides the cached information and the invalidation qualifying information returned from a corresponding valid cache entry corresponding to the address information specified by a given cache lookup request:

determining whether the given hit-indicating cache lookup response conflicts with an in-progress cache invalidation command, based on the invalidation scope information specified by the in-progress cache invalidation command and the invalidation qualifying information returned from the corresponding valid cache entry by the given hit-indicating cache lookup response; and in response to determining that the given hit-indicating cache lookup response conflicts with the in-progress cache invalidation command, causing the given hit-indicating cache lookup response to be treated as a miss-indicating cache lookup response indicating that the cache does not comprise any valid cache entry corresponding to the address information of the given cache lookup request.

* * * * *